(12) United States Patent
Dural et al.

(10) Patent No.: US 9,699,682 B2
(45) Date of Patent: Jul. 4, 2017

(54) CAPTURE OF PSS AND SSS WITH WIRELESS LOCAL AREA NETWORK RECEIVE CHAIN

(71) Applicant: QUALCOMM Incorporated, San Diego, CA (US)

(72) Inventors: Ozgur Dural, Sunnyvale, CA (US); Soumya Das, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/231,563

(22) Filed: Aug. 8, 2016

(65) Prior Publication Data

US 2016/0353311 A1   Dec. 1, 2016

Related U.S. Application Data

(63) Continuation of application No. 14/252,773, filed on Apr. 14, 2014.

(51) Int. Cl.
*H04W 24/10* (2009.01)
*H04W 74/04* (2009.01)
(Continued)

(52) U.S. Cl.
CPC .......... *H04W 24/10* (2013.01); *H04W 24/02* (2013.01); *H04W 56/003* (2013.01);
(Continued)

(58) Field of Classification Search
CPC ..... H04W 24/10; H04W 24/08; H04W 84/12; H04B 17/21
See application file for complete search history.

(56) References Cited

U.S. PATENT DOCUMENTS 8,451,776 B2   5/2013 Dayal et al.
8,472,465 B2   6/2013 Suo et al.
(Continued)

FOREIGN PATENT DOCUMENTS

EP   1164723 A2   12/2001
EP   1467585 A2   10/2004

OTHER PUBLICATIONS

International Search Report and Written Opinion—PCT/US2015/025354—ISA/EPO—Sep. 29, 2015.
(Continued)

*Primary Examiner* — Jae Y Lee
(74) *Attorney, Agent, or Firm* — Nerrie M. Zohn

(57) ABSTRACT

An apparatus for capturing a signal of interest, e.g., PSS and/or SSS, captures data transmitted by a first RAT by obtaining access to a receive chain for a second RAT during a measurement gap for the first RAT. The signal of interest transmitted by the first RAT is captured during the measurement gap using the receive chain for the second RAT. Access to a receive chain for the second RAT may be obtained in any one of several ways. For example, access may be obtained by 1) requesting receive chain access for the second RAT for LTE measurements through a virtual flow, 2) entering into a power save mode, 3) tuning to a non-operating channel, 4) setting network allocation vector (NAV) at or above a threshold value, or 5) entering a measurement mode during which the receive chain for the second RAT is prevented from performing WLAN operations.

34 Claims, 17 Drawing Sheets

(51) Int. Cl.
*H04W 56/00* (2009.01)
*H04W 24/02* (2009.01)
*H04W 52/02* (2009.01)
*H04W 88/06* (2009.01)
*H04W 84/12* (2009.01)

(52) U.S. Cl.
CPC ........ *H04W 74/04* (2013.01); *H04W 52/0229* (2013.01); *H04W 84/12* (2013.01); *H04W 88/06* (2013.01); *Y02B 60/50* (2013.01)

(56) References Cited

U.S. PATENT DOCUMENTS

| | | | |
|---|---|---|---|
| 8,547,836 | B2 | 10/2013 | Feder et al. |
| 2006/0223557 | A1 | 10/2006 | Manohar et al. |
| 2009/0213819 | A1 | 8/2009 | Kalhan |
| 2012/0094663 | A1 | 4/2012 | Awoniyi et al. |
| 2012/0163346 | A1 | 6/2012 | Chin et al. |
| 2012/0188907 | A1 | 7/2012 | Dayal et al. |
| 2013/0070653 | A1 | 3/2013 | Banister et al. |
| 2013/0225068 | A1* | 8/2013 | Kiminki ............ H04W 52/0216 455/39 |
| 2013/0242780 | A1 | 9/2013 | Dayal et al. |
| 2014/0031031 | A1* | 1/2014 | Gauvreau ............ H04L 5/0053 455/426.1 |
| 2014/0146696 | A1* | 5/2014 | Lin ....................... H04W 72/12 370/252 |
| 2014/0247743 | A1 | 9/2014 | Seo |
| 2015/0181514 | A1* | 6/2015 | Belghoul .......... H04W 72/1215 370/254 |
| 2015/0296397 | A1 | 10/2015 | Dural |
| 2015/0296468 | A1 | 10/2015 | Dural |

OTHER PUBLICATIONS

Motorola: "E-UTRAN Measurement Gap Control for Inter-Frequency and Inter-RAT Handover," 3rd Generation Partnership Project (3GPP); Technicalspecification Group (TSG) Radio Access Network (RAN); Workinggroup 2 (WG2), XX, XX, vol. R2-072012, May 7, 2007 (May 7, 2007), pp. 1-6, XP003018979.
Partial International Search Report—PCT/US2015/025354—ISA/EPO—Jul. 10, 2015.

* cited by examiner

CAPTURE OF PSS AND SSS WITH WIRELESS LOCAL AREA NETWORK RECEIVE CHAIN

CROSS-REFERENCE TO RELATED APPLICATION

This application is a continuation of and claims the benefit of U.S. application Ser. No. 14/252,773, entitled "CAPTURE OF PSS AND SSS WITH WIRELESS LOCAL AREA NETWORK RECEIVE CHAIN" and filed on Apr. 14, 2014, which is expressly incorporated by reference herein in its entirety.

BACKGROUND

Field

The present disclosure relates generally to communication systems, and more particularly, to the capture of primary synchronization signals (PSS) and secondary synchronization signals (SSS) of a Long Term Evolution (LTE) waveform with a wireless local area network (WLAN) receive chain.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Methods, computer program products, and apparatuses are provided for capturing a signal of interest transmitted by a wireless wide area network (WWAN) during each of a plurality of communication frames. The signal of interest may be a primary synchronization signal (PSS) or a secondary synchronization signal (SSS) and the periodicity of the transmission of the signal of interest is the minimum duration of a capture needed for detecting the PSS and/or SSS for a LTE signal. Data transmitted by the WWAN is captured for each of a plurality of the communication frames.

In one implementation, data is captured for a capture length corresponding to a duration less than the periodicity of transmission of the signal of interest. The capturing is done with a WLAN receive chain, and each capture occurs at a different point within its respective communication frame relative to other communication frames. The plurality of data captures are processed to form an equivalent continuous data corresponding to a duration greater than the periodicity of transmission. Because the continuous data has a duration greater than the periodicity of transmission of the signal of interest, the signal of interest will be contained in the captured data and PSS and/or SSS detection can occur.

The above implementation applies to situations where the availability of the WLAN radio does not allow for a capture duration sufficient to capture a signal of interest in a single shot. For example, the situations above do not allow for a WLAN modem to capture 5.1 ms of data at once. Accordingly, multiple captures occur over time and are accumulated to obtain the 5.1 ms of data. In some situations, the WLAN modem may be available for longer periods of time to allow for signal capture in a single shot.

Accordingly, in another implementation, access to a wireless local area network (WLAN) receive chain is obtained for a period of time corresponding to a measurement gap. The signal of interest transmitted by the WWAN is captured during the measurement gap using the WLAN receive chain. Access to a WLAN receive chain may be obtained in any one of several ways. For example, access may be obtained by 1) requesting WLAN receive chain access for LTE measurements through a virtual flow, 2) entering into a power save mode, 3) tuning to a non-operating WLAN channel, 4) setting network allocation vector (NAV) at or above a threshold value, or 5) entering a measurement mode during which the WLAN receive chain is prevented from performing WLAN operations.

In another implementation, which is a combination of the foregoing implementations, obtaining access to a WLAN receive chain for a period of time corresponding to a measurement gap is attempted. If the attempt is successful, the signal of interest is captured during the measurement gap using the WLAN receive chain. If the attempt to obtain access to the WLAN receive chain for the measurement gap is unsuccessful, then for each of a plurality of communication frames, data is captured for a capture length corresponding to a duration less than the periodicity of transmission of the signal of interest. The capturing is done with the WLAN receive chain, and each capture occurs at a different point within its respective communication frame relative to other communication frames. The plurality of data captures are processed to form an equivalent continuous data corresponding to a duration greater than the periodicity of transmission.

DETAILED DESCRIPTION

Figure 1:
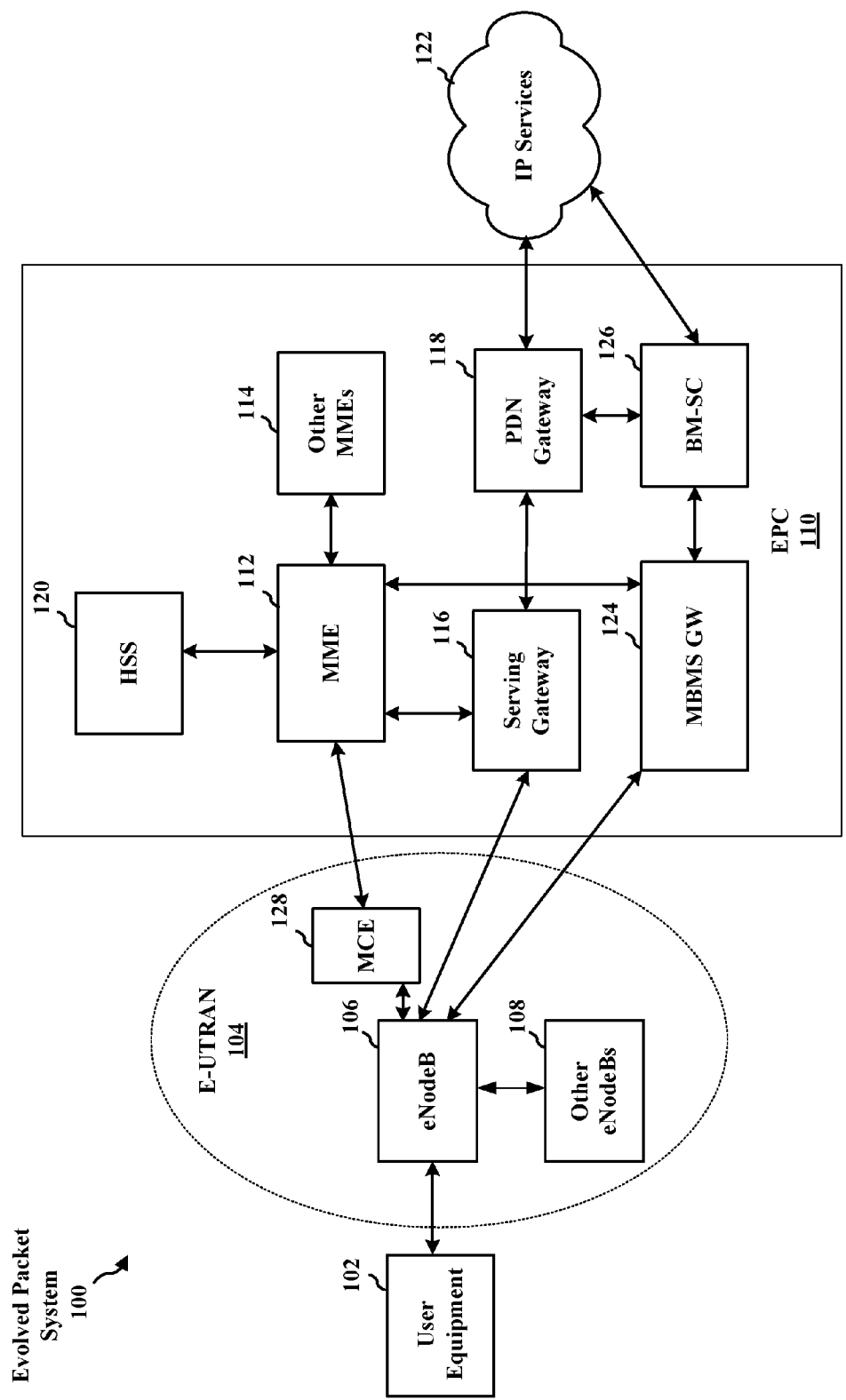
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway (SGW) 116, a Multimedia Broadcast Multicast Service (MBMS) Gateway 124, a Broadcast Multicast Service Center (BM-SC) 126, and a Packet Data Network (PDN) Gateway (PGW) 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a Public Land Mobile Network (PLMN), and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
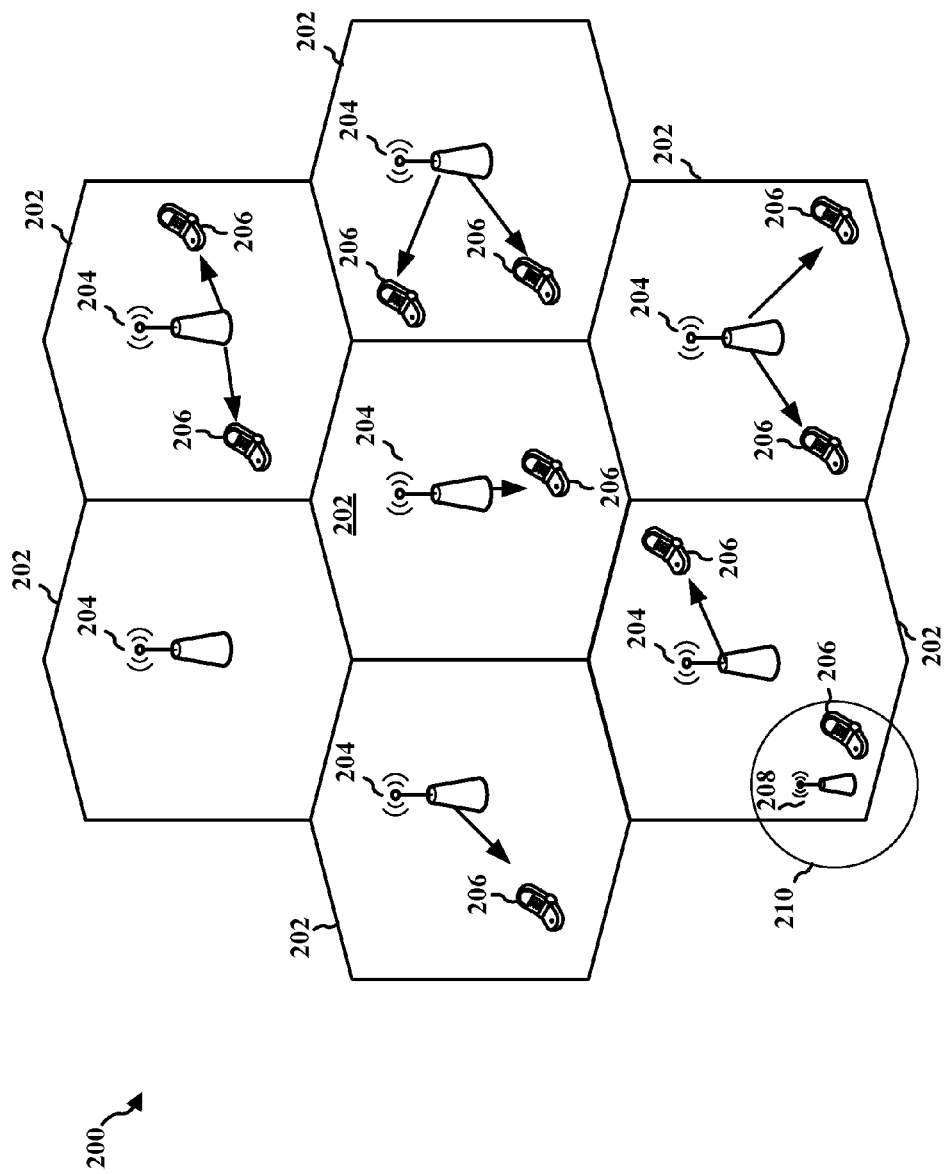
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDMA is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
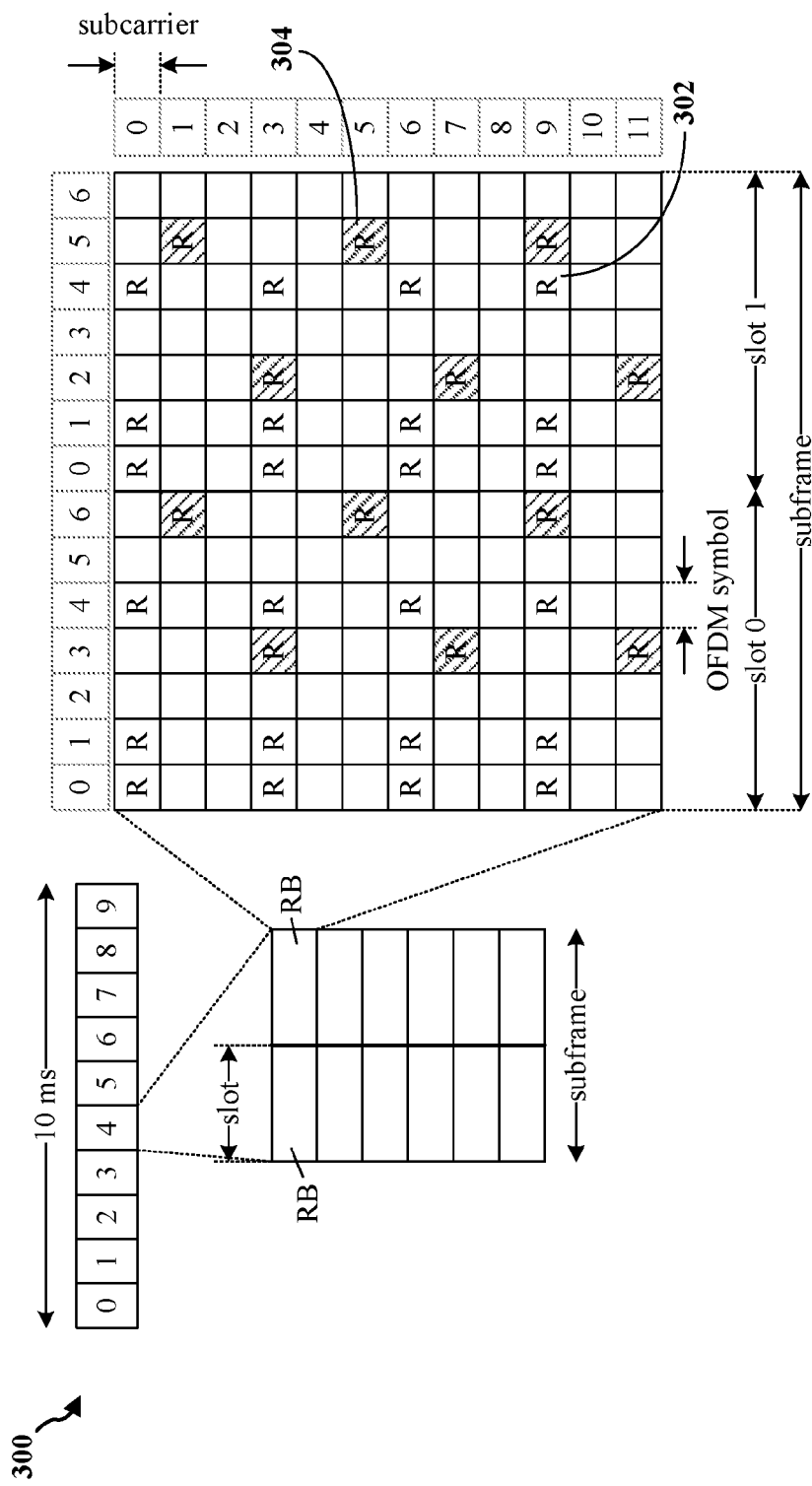
FIG. 3 is a diagram illustrating an example of a DL frame structure in LTE.

FIG. 3 is a diagram 300 illustrating an example of a DL frame structure in LTE using normal cyclic prefix. A frame (10 ms) may be divided into 10 equally sized subframes each of duration 1 ms. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
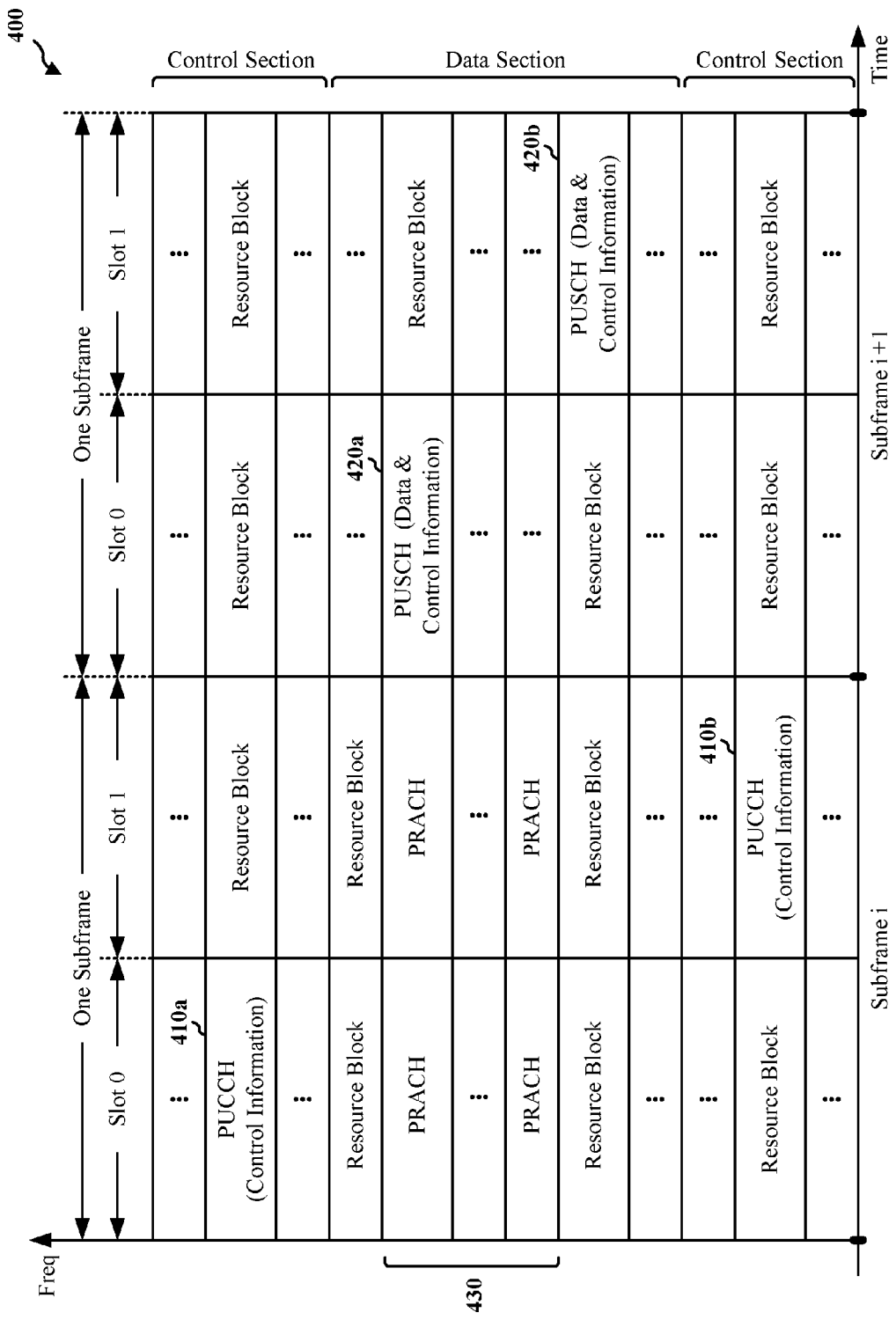
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
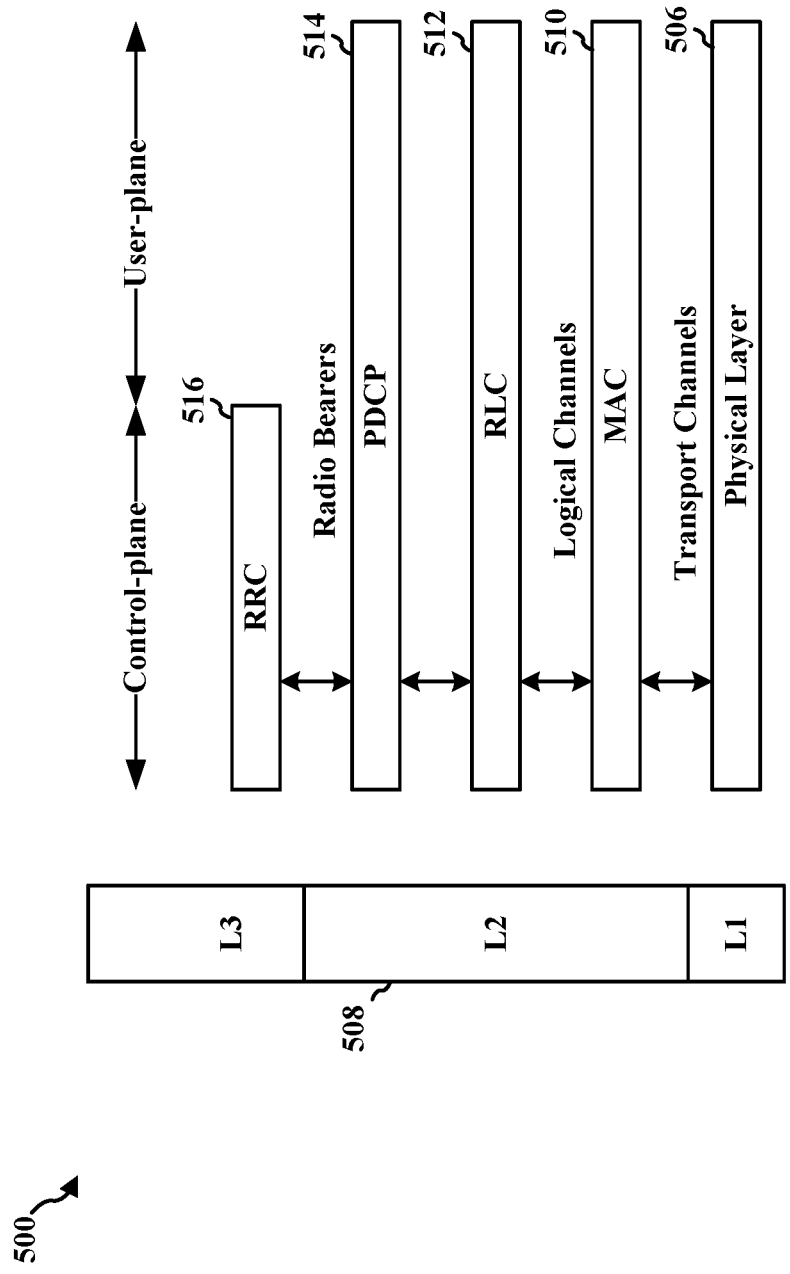
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
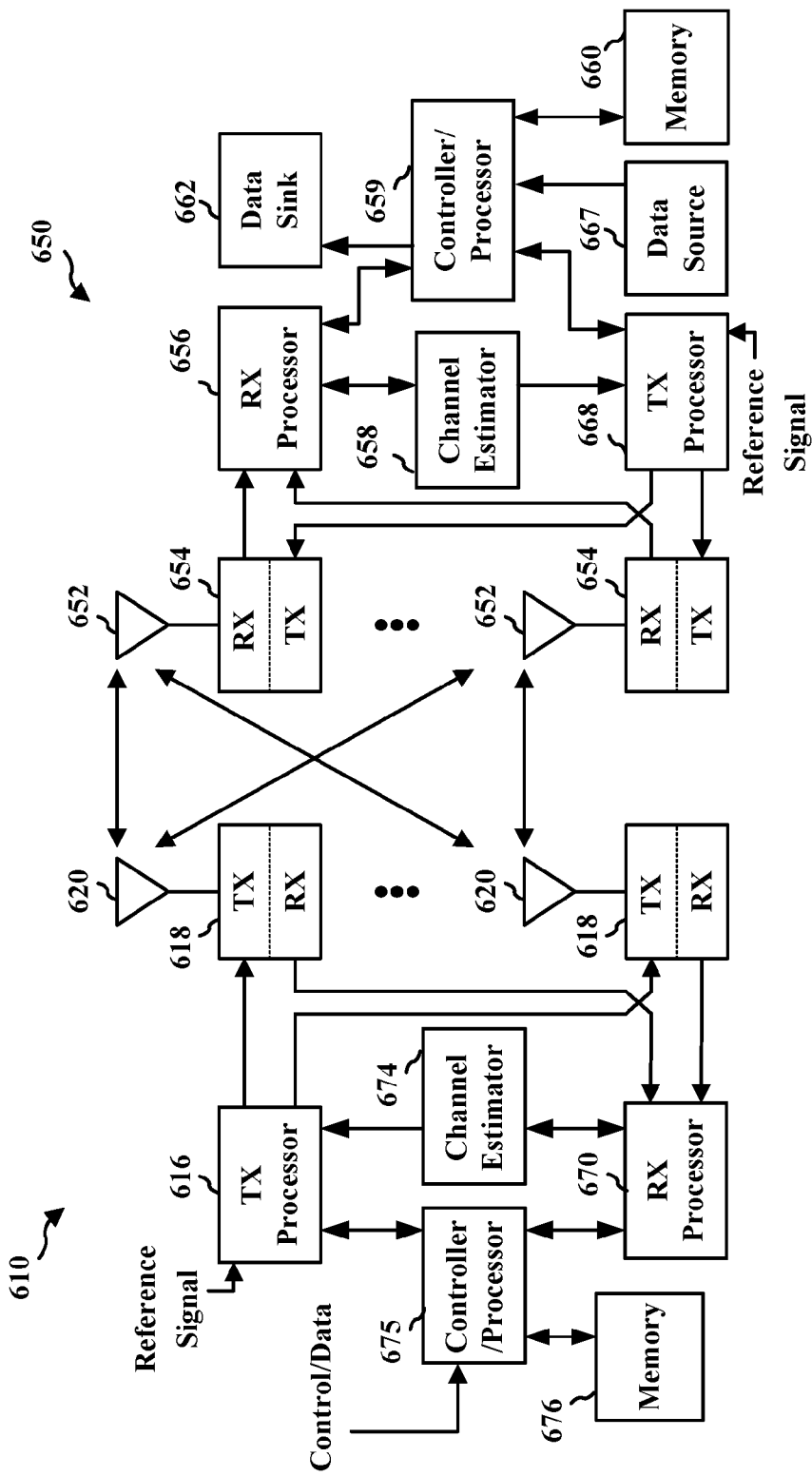
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

Figure 7:
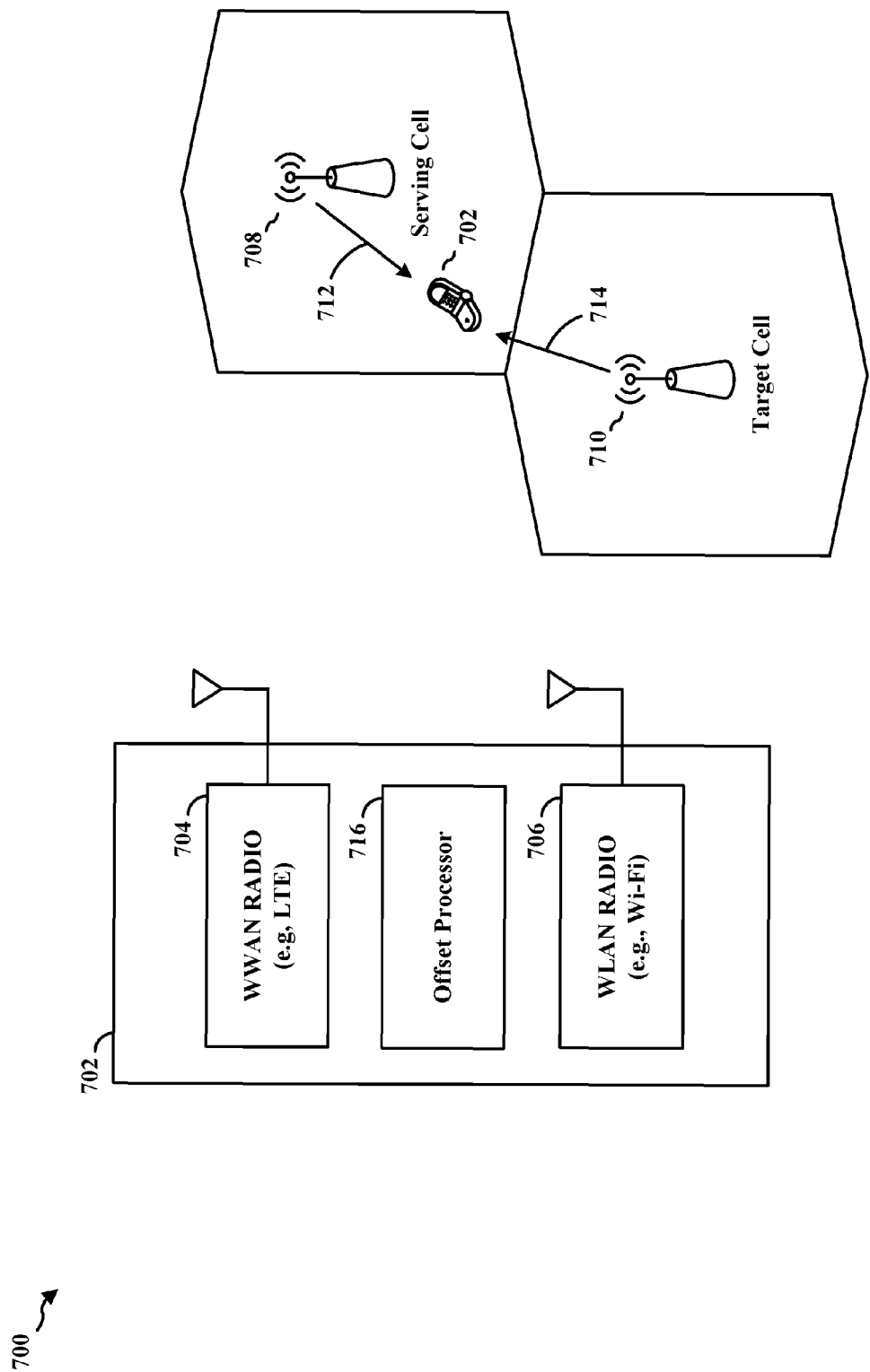
FIG. 7 is an illustration of a UE with multiple radios.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations FIG. 7 is an illustration 700 of a UE 702 with multiple radios. The UE 702 may contain a WWAN (2/3/4G LTE) radio 704 and WLAN (802.11) radio 706. Although WWAN radios and WLAN radios are initially designed for specific communication needs, with advances in technology and needs for higher data rates, the use of these two types of radios has started to overlap. It is possible to use a WLAN modem 706 whenever it is available to assist the WWAN modem 704 and vice versa. One such assistance can be during inter-frequency measurements for LTE. For example, when the UE 702 is in connected mode with a serving cell 708, the WLAN radio 706 may assist in cell search and cell measurement for LTE at other frequencies than the serving cell frequency. For example, a UE 702 may need to monitor neighboring cells for potential handovers when the serving cell signal strength becomes weak compared to a predefined threshold. When the neighbor cell is on a frequency different than the current serving frequency, the neighbor cell search and measurement is an inter-frequency cell search and measurement. The carrier frequency of a "target" inter-frequency neighbor cell 710 is referred to as "target frequency." When the target frequency is sufficiently apart from the serving cell frequency, the measurements on target frequency will require the UE 702 to tune away from its serving frequency. Note that the target frequency may belong to the same frequency band as the serving frequency, or it may belong to a different frequency band.

In a baseline operation of a UE 702 having both a WWAN modem 704 and a WLAN modem 706, the WLAN radio may be used to measure one or more target cells 710 on one or more target frequencies, while the WWAN modem measures serving cells 708 on the serving frequency. As used herein, a "serving cell" 708 is a cell with which the WWAN modem 704 is currently connected to, i.e. has a radio connection. The serving cell 708 has a base station that communicates with the WWAN modem 704 of the UE 702 over a serving frequency An inter-frequency cell referred to as the "target cell" 710 is the cell where the WWAN modem 704 needs to tune away to do inter-frequency measurements on frequencies different from the serving frequency.

If the UE has one receive chain or the UE has multiple receive chains all of which are configured to operate with the serving cell, assistance from the WLAN radio 706 is beneficial because performance of inter-frequency cell search and measurements by the LTE modem 704 itself requires the UE to tune away from the serving frequency, and thus the serving cell, to other frequencies to obtain measurements. The LTE modem 704 may tune away during specified times referred to as measurement gaps. The inter-frequency measurement gaps are configured by the serving eNB allowing the UE to tune away from serving frequency for inter-frequency cell search and measurements. The UE is not scheduled any DL packets during these measurement gaps and thus is not receiving any data from the serving cell 708.

Similarly the UE cannot transmit UL packets during these measurement gaps to the serving cell 708. This results in loss of DL and UL throughput as opposed to the case where the UE is not scheduled any measurement gaps.

The use of the WLAN modem 706 to assist inter-frequency measurements avoids measurement gaps, results in higher throughput and better user experience. The WLAN modem 706 may be in idle mode while the WWAN modem 704 is in connected mode. Thus, the WLAN modem 706 is available for assisting inter-frequency WWAN measurements. Even when the WLAN modem 706 is in connected mode, the WLAN modem 706 can create gaps in WLAN Tx/Rx for the WWAN inter-frequency measurements if needed.

Cell search, including in particular inter-frequency neighbor cell search, in LTE involves the detection of primary synchronization signals (PSS) and secondary synchronization signals (SSS). In general, cell search implementation relies on 6 ms measurement gap length to capture approximately 5.1 ms samples for PSS/SSS detection. The extra 0.9 ms is needed in order for the modem to tune away to a next frequency, and then to tune back to the original frequency, after capturing signals. The 6 ms gaps may occur every 40 ms or 80 ms depending on the measurement gap pattern.

Accordingly, such detection requires a modem that is able to collect signal samples at once across a 5.1 ms duration of a radio frame. A WWAN modem is able to collect the required number of consecutive samples at once. A WLAN modem, however, may not be able to collect all of those samples at once. For example, due to buffer limitations and the need for explicit triggering, a WLAN modem cannot collect samples of 5.1 ms in one shot.

A WLAN modem may have to do multiple captures in order to collect signal samples for cell search. For example, for a WLAN modem configuration at 57.6 MHz analog-to-digital (ADC) sampling rate, with a 8K sample buffer and 7.56 μs hardware and software triggering delay causing a gap between captures, requires thirty-five captures with thirty-four gaps between these captures in order to capture the 5.1 ms. Thus, with a WLAN modem there are many instances of captured data followed by a gap. To date, no techniques are available to recover the lost data in those gaps. Therefore, there is a loss in performance together with misdetections and false alarms.

The table below shows the required number of captures required in 5.1 ms as a function of changes in ADC sample rate. The ADC sampling rates correspond to those rates that may be applied in an LTE modem.

| ADC Sampling (MHz) | Capture Duration (μs) | Number of Captures in 5.1 ms |
|---|---|---|
| 5 | 1600 | 4 |
| 7.68 | 1041.67 | 5 |
| 15.36 | 520.83 | 10 |
| 30.72 | 260.42 | 19 |
| 57.6 | 138.89 | 35 |

With decreasing ADC sampling rate, the number of required gaps decreases. Decreasing the sampling rate, however, has drawbacks. For example, decreasing the sampling rate limits the amount of filtering that can be done on the digital samples which helps with jammers and signal-to-noise ratio (SNR). One other drawback is that any correction that needs to be done in the digital domain, such as corrections due to frequency offset, can only be done coarsely, if at all. Regardless of any decrease in sampling rate and corresponding decrease in gaps, gaps are still present. Accordingly, a loss of performance, misdetections and false alarms remain.

Disclosed herein are techniques for capturing signals of interest transmitted by a first communications network supported by a first RAT, using a modem of a second RAT. The first communications network may be an LTE network and the signal of interest may be PSS and SSS signals for cell search. The second RAT may support a WLAN, such as Wi-Fi, in which case a WLAN modem is used to capture the signals of interest. The WLAN modem hardware may also be used to support other communication technologies, such a Bluetooth. In such cases, measures should be taken to ensure that use of the WLAN modem for LTE measurements does not interfere with either of the WLAN communications or the Bluetooth communications.

Signals of interest are typically transmitted periodically by a communications network. For example, PSS signals are periodically transmitted with a period of 5 ms. SSS signals have two 5 ms phases and therefore are periodically transmitted with a period of 10 ms. In one technique of recovering PSS and SSS signals without gaps, captures for durations less than a subframe are periodically repeated over a number of radio frames until a total capture length of 5 ms is obtained. The captures are then combined, for example by concatenation, to form 5 ms of continuous data. This way it is guaranteed to have a 5 ms capture with a full PSS and SSS in it.

Figure 8:
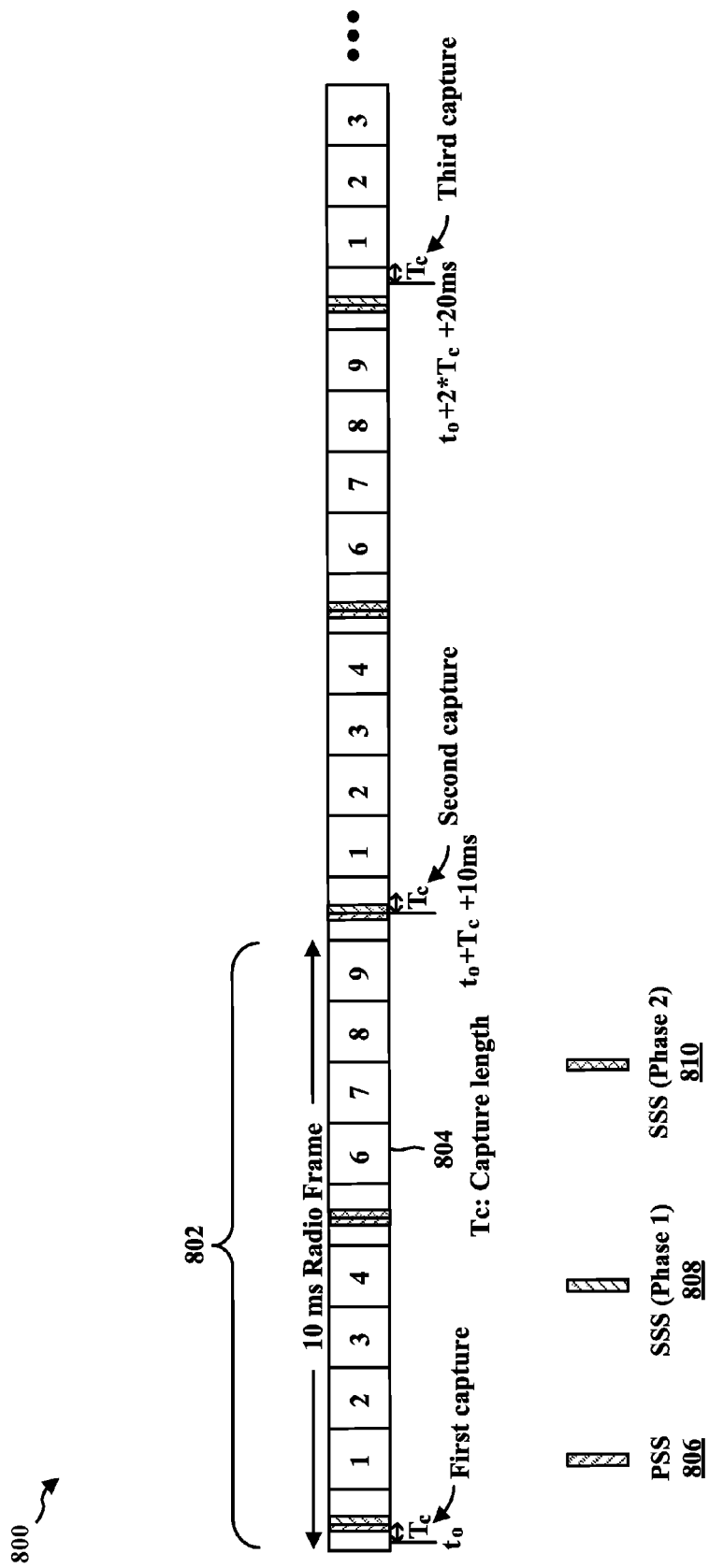
FIG. 8 is an illustration of a radio communication frame structure of LTE in the time domain.

FIG. 8 is an illustration 800 of a radio communication frame structure of LTE in the time domain. Each radio frame 802 is 10 ms long and includes ten subframes 804. Particular signals of interest, e.g., PSS 806 and SSS 808, 810, are transmitted in every radio frame 802 and occur at the same place and at the same time. For example, PSSs occur at a point in time in subframe 0 and again at the same point in time 5 ms later in subframe 5. The PSS occurs at the same times in the next radio frame. The first phase of a SSS occurs at a point in time in subframe 0, while the second phase of SSS occurs 5 ms later in subframe 5. The first phase of SSS and second phase of SSS occur at the same respective times in the next radio frame.

In accordance with the foregoing technique, and with continued reference to FIG. 8, an amount of signal samples (also referred to as "data") are captured during a first capture instance beginning at a time $t_0$ and continuing for a capture length $T_C$. The capture length is substantially less than a half frame, e.g., 5 ms, and less than a subframe, e.g., 1 ms. As shown above in Table 1, the capture length $T_C$ is a function of sampling rate and may range from 139 microseconds (μs) to 1600 μs. The time $t_0$ is an arbitrary time at which capture starts. As shown in FIG. 8, during this first data capture instance samples corresponding to the PSS and SSS are captured. This however, is not necessarily the case, as the data captured depends on the location of the start time $t_0$, relative to the position of the signals within the communication frame 802

The foregoing capturing is repeated for additional communication frames 802 to obtain additional capture instances. The additional captures, however, occur at times offset from the capture time of the initial communication frame. The offset time may be based on the length of the communication frame and the capture length $T_C$. In the example of FIG. 8, the offset time is equal to the capture length $T_C$ plus the length of the communication frame, which is 10 ms. Accordingly, at this offset time an amount of signal samples are captured for a second capture period that also has a capture length $T_C$. As shown in FIG. 8, during this capture duration, data other than PSS and SSS are captured. Next, beginning at an offset time equal to two times the capture duration $T_C$ plus 10 ms, another amount of signal samples are captured during a third capture period having a capture length $T_C$. As shown in FIG. 8, during this capture duration, data other than PSS and SSS are captured.

The process of capturing data for a period of time $T_C$ is repeated until a total of 5.1 ms of data is captured. The samples captured during these capture instances are concatenated together to form a 5.1 ms continuous data. Because 5.1 ms of continuous data is captured, these data are guaranteed to have a complete PSS and SSS (either Phase 1 or Phase 2) regardless of the starting time $t_0$. Therefore they can be treated as if they are received in one shot.

The data may be provided to a processor, e.g., correlator, to determine the locations of the PSS and SSS within the data. The PSS and SSS are then used for cell search and measurement. In accordance with the foregoing technique, there are no gaps present in the 5.1 ms continuous data. The drawback is the latency due to the 10 ms periodicity. This technique may be more suited for the cases with high performance is necessary and gaps cannot be tolerated within the captured signal. Also, another suitable case is where WLAN modem cannot spare 5 ms chunks of its resources at once because it might be serving WLAN application but it can give smaller chunks of time periodically to do LTE tasks.

An adaptive measurement gap length and adaptive measurement gap repetition period may be possible. In some situations, a WLAN modem may be available for LTE measurements for a duration larger than the capture lengths described above with reference to FIG. 8, which were less than one subframe. For example, WLAN modems that function to serve both a WLAN, e.g., Wi-Fi, and Bluetooth communications, may be available for LTE measurements for durations greater than one subframe. For example, in one type of Bluetooth communication frame structure, a capture duration of up to approximately 1.5 ms may be available, while in another Bluetooth communication frame structure, a capture duration of up to approximately 2.8 ms may be available. Techniques using such WLAN modems for LTE measurements, however, should not impact LTE performance, nor should they interfere with Bluetooth traffic. This is particularly relevant to modems wherein the WLAN and Bluetooth do not have independent frequency synthesizers.

Figure 9:
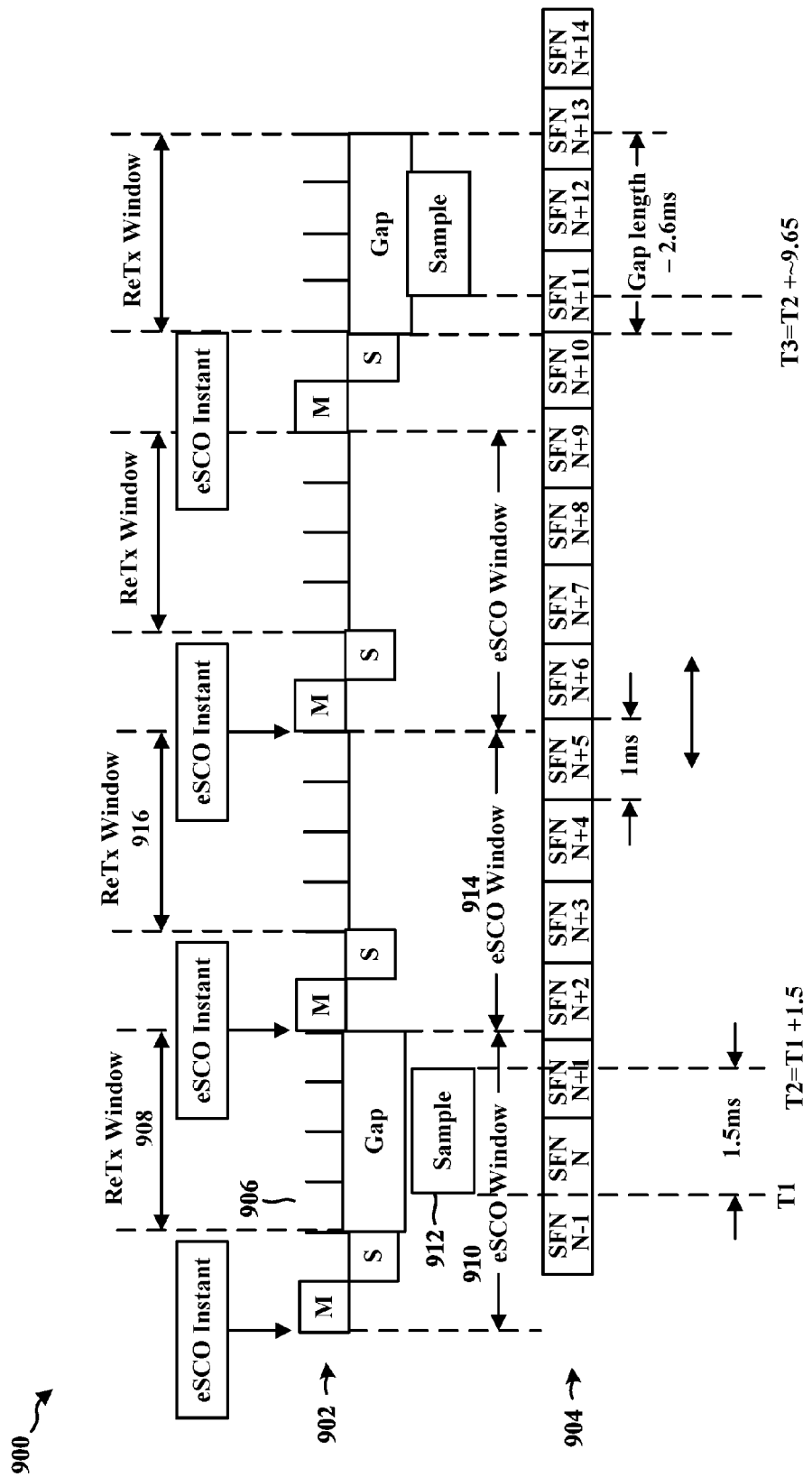
FIG. 9 is an illustration of Bluetooth communication windows of a first type along with LTE communication frames.

FIG. 9 is an illustration 900 of Bluetooth communication windows 902 of a first type along with LTE communication frames 904, both as a function of time. The Bluetooth communication windows illustrated are a configuration that facilitates communications in accordance with the enhanced synchronous connection-oriented (eSCO) protocol for voice data. The Bluetooth communication windows may be referred to as eSCO windows.

Each eSCO window 902 includes six Bluetooth slots 906. The duration of each slot is 625 µs. The first slot is for master to slave transmissions, while the second slot is slave to master transmissions. The first slot and the second slot form an eSCO instant. The four slots after the second slot are reserved for retransmissions of packets that did not go through. These four slots form ReTx windows.

In accordance with techniques disclosed herein, several samples of data transmitted in accordance with a first RAT are captured by a receive chain of a second RAT during portions of several eSCO windows. The portion during which capture occurs may be referred to as a capture length $T_C$. The data captured during each a capture length $T_C$ are combined to form a duration of continuous data in order to obtain a signal of interest.

More specifically, during a first ReTx window 908 of a first eSCO window 910, the second receive chain foregoes Bluetooth retransmission and instead tunes away to a LTE frequency and captures LTE data. In this case, the ReTx window may be considered a measurement gap. The duration of the ReTx window is approximately 2.5 ms. Accounting for 0.45 ms for tune away by the second receive chain at the front end of the measurement gap, and 0.45 ms for tune back at the back end of the gap, the effective duration of the capture instance 912, i.e., data sample, or a capture length $T_C$, is approximately 1.5 ms.

The foregoing capturing is repeated for one or more additional eSCO windows 914 and corresponding ReTx windows 916 to obtain additional capture instances. While the additional captures occur at the approximately the same time and for the same duration within each ReTx window, with respect to the LTE communications frame 904, the captures occur at times offset from the capture time of the initial LTE communication frame. For example, in FIG. 9, the second sample capture begins at time T3, which is approximately 12 ms after the beginning of the first sample capture at time T1. At offset time T3 an amount of signal samples are capture for a second capture period that also has a capture length $T_C$. The process of capturing data for a period of time $T_C$ is repeated until a total of 5.1 ms of data is captured.

Figure 10:
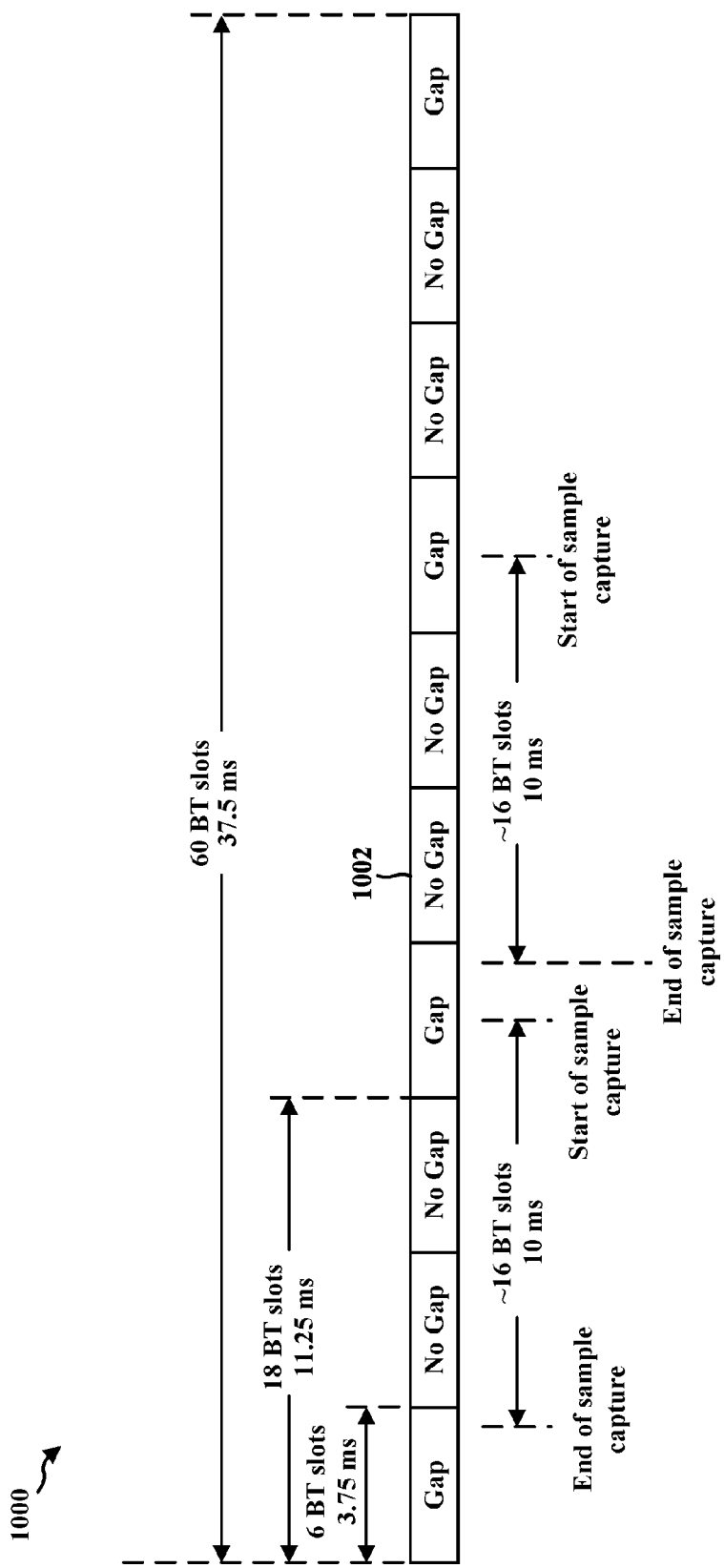
FIG. 10 is an illustration of Bluetooth communication windows sufficient to 5.1 ms of data samples.

FIG. 10 is an illustration 1000 of Bluetooth communication windows 1002 sufficient to capture 5.1 ms of data samples. Each communication windows 1002 is designed as either a gap window or a no gap window. Gap windows correspond to eSCO windows during which LTE data samples were captured during the ReTx window of the eSCO window. No gap windows correspond to eSCO windows during which no LTE data samples were captured during the ReTx window of the eSCO window.

From FIG. 10, it is noted that it takes sixty Bluetooth slots, which is approximately 37.5 ms, to capture a number, e.g., four, of LTE data samples sufficient to form an approximately 5.1 ms sample of continuous LTE data. It is also noted that the time between the end of a sample capture and the start of a next sample capture is sixteen Bluetooth slots, which is approximately the duration of a 10 ms LTE radio communication frame.

The samples captured during these capture instances are concatenated together to form a 5.1 ms continuous data. Because 5.1 ms of continuous data is captured, these data are guaranteed to have a complete PSS and SSS (either Phase 1 or Phase 2). The data may be provided to a processor, e.g., correlator, to determine the locations of the PSS and SSS within the data. The PSS and SSS are then used for cell search and measurement. In accordance with the foregoing technique, there are no gaps present in the 5.1 ms continuous data.

Figure 11:
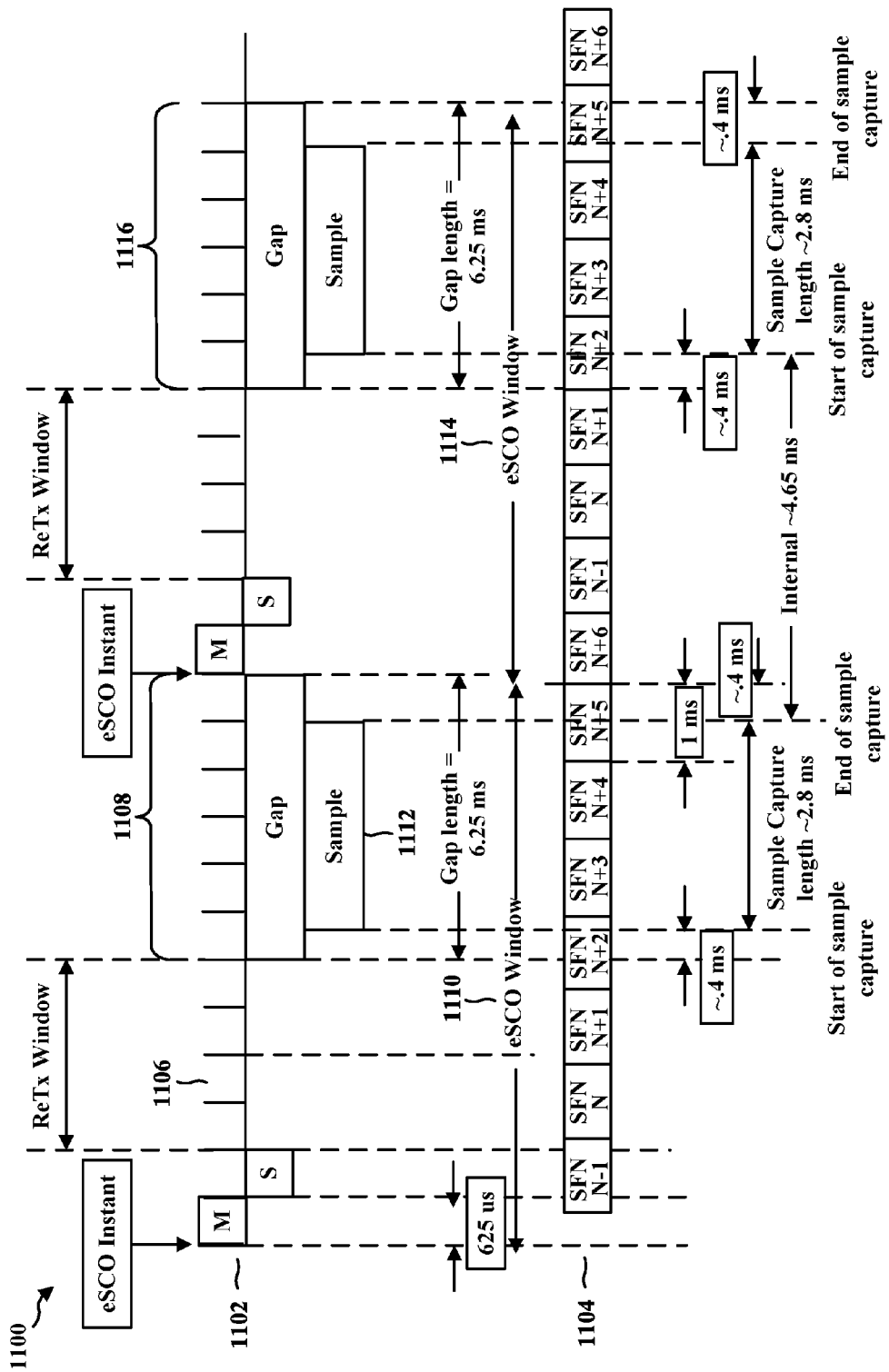
FIG. 11 is an illustration of Bluetooth communication windows of a second type along with LTE communication frames.

FIG. 11 is an illustration 1100 of Bluetooth communication windows 1102 of a second type along with LTE communication frames 1104, both as a function of time. The Bluetooth communication windows illustrated facilitate communications in accordance with the enhanced synchronous connection-oriented (eSCO) protocol for voice data. The Bluetooth communication windows may be referred to as eSCO windows.

In this configuration, each eSCO window 1102 includes twelve Bluetooth slots 1106. The duration of each slot is 625 µs. The first slot is for master to slave transmissions, while the second slot is slave to master transmissions. The first slot and the second slot form an eSCO instant. The four slots after the second slot are reserved for retransmissions of packets that did not go through. These four slots form ReTx windows. The following six slots may be available for LTE measurements and are referred to herein as a measurement window.

In accordance with techniques disclosed herein, several samples of data transmitted in accordance with a first RAT are captured by a receive chain of a second RAT during portions of several eSCO windows. The portion during which capture occurs may be referred to as a capture length $T_C$. The data captured during each a capture length $T_C$ are combined to form a duration of continuous data in order to obtain a signal of interest.

More specifically, during a first measurement window 1108 of a first eSCO window 1110, the second receive chain tunes away to a LTE frequency and captures LTE data. The duration of the ReTx window is approximately 3.75 ms. Accounting for 0.45 ms for tune away by the second receive chain at the front end of the measurement gap, and 0.45 ms for tune back at the back end of the gap, the effective duration of the capture instance 1112, i.e., data sample, or a capture length $T_C$, is approximately 2.8 ms. This is approximately twice as large as the capture length of 1.5 ms available using the first configuration of Bluetooth communication windows shown in FIG. 9.

The foregoing capturing is repeated for one additional eSCO windows 1114 and corresponding measurement windows 1116 to obtain additional capture instances. While the additional captures occur at approximately the same time and for the same duration within each measurement window, with respect to the LTE communications frame 1104, the captures occur at times offset from the capture time of the initial LTE communication frame. For example, in FIG. 11, the second sample capture begins at time T3, which is approximately 7.5 ms after the beginning of the first sample capture at time T1. At offset time T3 an amount of signal samples are capture for a second capture period that also has a capture length $T_C$.

The two samples captured during these capture instances are concatenated together to form a 5.1 ms continuous data. This pattern of capture may be repeated every five eSCO windows. Because 5.1 ms of continuous data is captured, these data are guaranteed to have a complete PSS and SSS (either Phase 1 or Phase 2). The data may be provided to a processor, e.g., correlator, to determine the locations of the PSS and SSS within the data. The PSS and SSS are then used for cell search and measurement. In accordance with the foregoing technique, there are no gaps present in the 5.1 ms continuous data.

Figure 12:
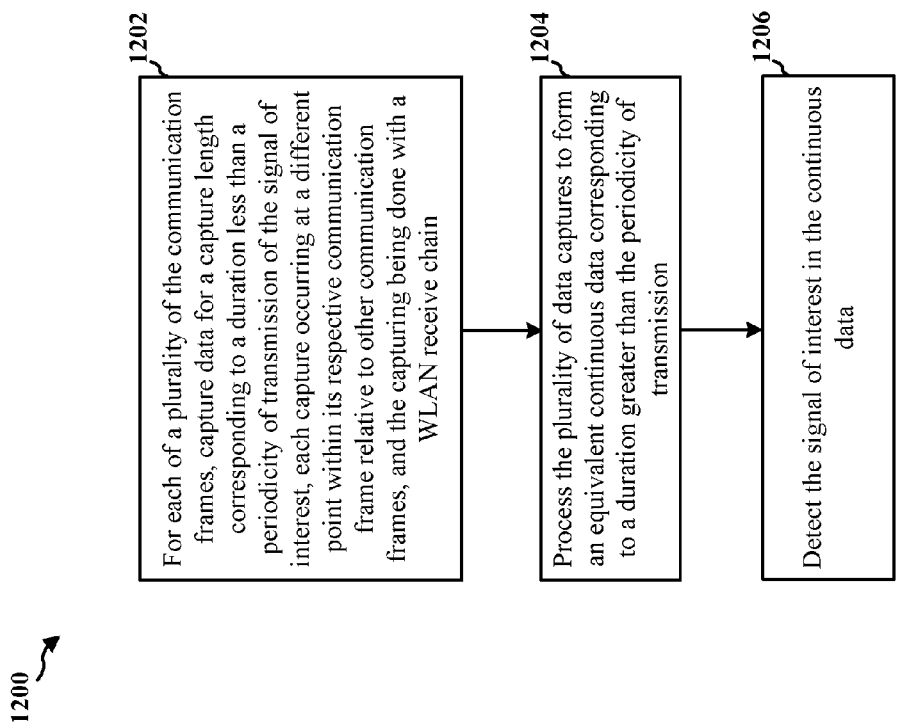
FIG. 12 is a flow chart of a method of capturing a signal of interest transmitted by a WWAN during each of a plurality of communication frames.

FIG. 12 is a flow chart 1200 of a method of capturing a signal of interest transmitted by a WWAN during each of a plurality of communication frames. The method may be performed by a UE. At step 1202, the UE captures data transmitted by the WWAN for a capture length corresponding to a duration less than a periodicity of transmission of the signal of interest. Each capture occurs at a different point within its respective communication frame relative to other communication frames, and the capturing is done with a WLAN receive chain. The UE captures data for each of a plurality of the communication frames.

As shown in FIG. 8, each data capture may begin at a respective capture time. The time between consecutive capture times defines a capture period, and the capture period varies among the plurality of data captures. In an embodiment, such as shown in FIG. 8, the capture period increases for each data capture.

In one implementation, the periodicity of transmission of the signal of interest is a half frame and the capture length is less than one subframe. An example of this implementation is shown in FIG. 8, where capture length $T_c$ is less than one subframe. In other implementations, the period of transmission of the signal of interest is a half frame and the capture length is between one subframe and three subframes. Examples of such implementations are shown in FIG. 9, where the capture length, e.g., sample 912, is approximately 1.5 ms, and in FIG. 11, where the capture length, e.g., sample 1112, is approximately 2.8 ms.

The WLAN receive chain may be included in a modem that supports communication by a wireless technology standard that invokes repeating communication windows at least partially overlapping in time with the communication frames. The communication windows have corresponding measurement gaps. In this case, the UE captures data during a respective measurement gap. For example, the wireless technology standard may be Bluetooth, in which case the measurement gap corresponds to a number of Bluetooth slots, each slot being approximately 625 µS long. For example, with reference to FIG. 9, the measurement gap corresponds to four Bluetooth slots, while in FIG. 11, the measurement gap corresponds to six Bluetooth slots.

At step 1204, the UE processes the plurality of data captures to form an equivalent continuous data corresponding to a duration greater than the periodicity of transmission of the signal of interest. The plurality of data captures may be processed by concatenating the data captures to form the continuous data.

At step 1206, the UE detects the signal of interest in the continuous data. The signal of interest may be at least one of a PSS, a phase 1 SSS, and a phase 2 SSS.

Figure 13:
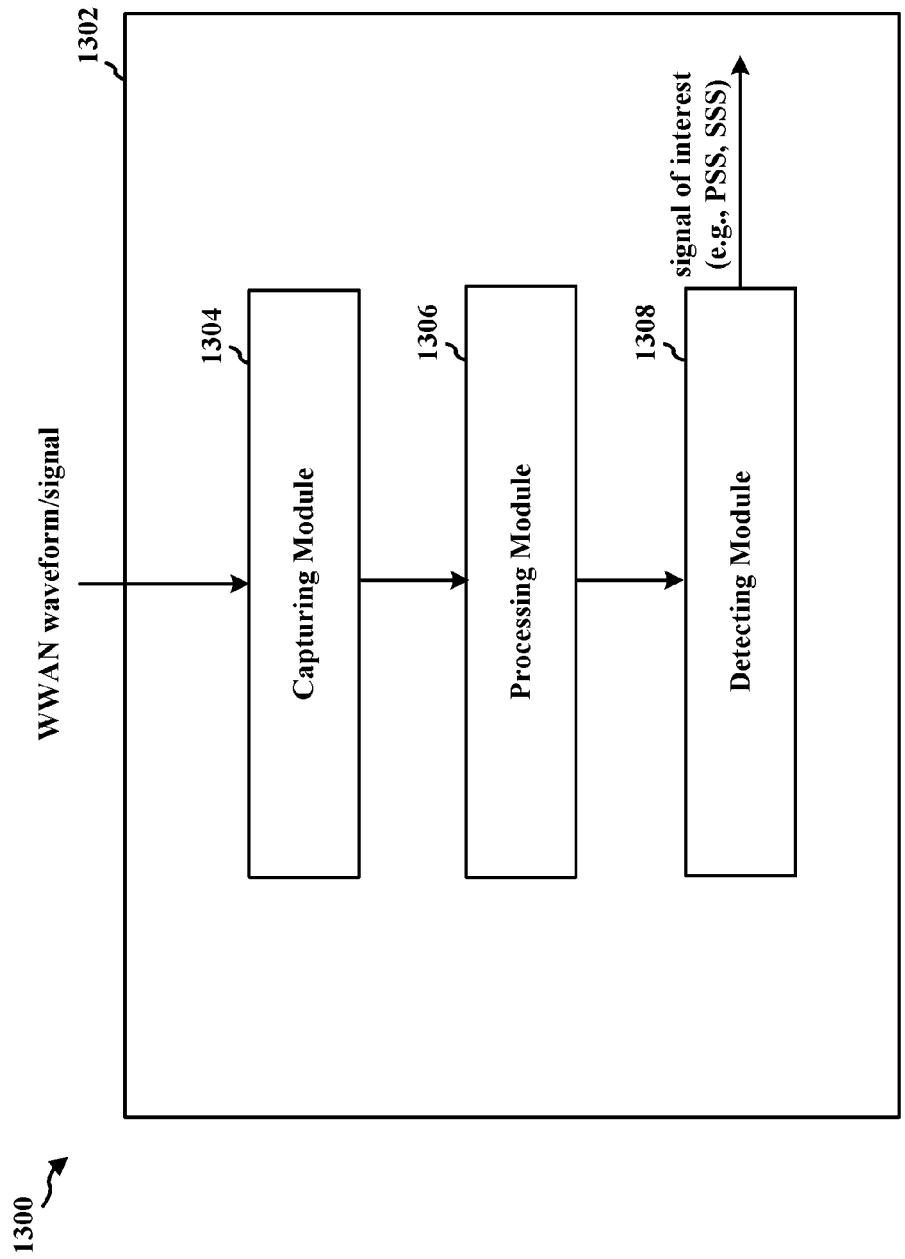
FIG. 13 is a conceptual data flow diagram illustrating the data flow between different modules/means/components in an exemplary apparatus that implements the method of FIG. 12.

FIG. 13 is a conceptual data flow diagram 1300 illustrating the data flow between different modules/means/components in an exemplary apparatus 1302. The apparatus 1302 may be a UE. The apparatus 1302 includes a capturing module 1304, a processing module 1306, and a detecting module 1308.

The capturing module 1304 captures data transmitted by the WWAN for each of a plurality of the communication frames. The data is captured for a capture length corresponding to a duration less than a periodicity of transmission of the signal of interest. Each capture occurs at a different point within its respective communication frame relative to other communication frames, and the capturing is done with a WLAN receive chain The processing module 1306 processes the plurality of data captures to form an equivalent continuous data corresponding to a duration greater than the periodicity of transmission. The detecting module 1308 detects the signal of interest in the continuous data.

The apparatus may include additional modules that perform each of the steps of the algorithm in the aforementioned flow chart of FIG. 12. As such, each step in the aforementioned flow chart of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
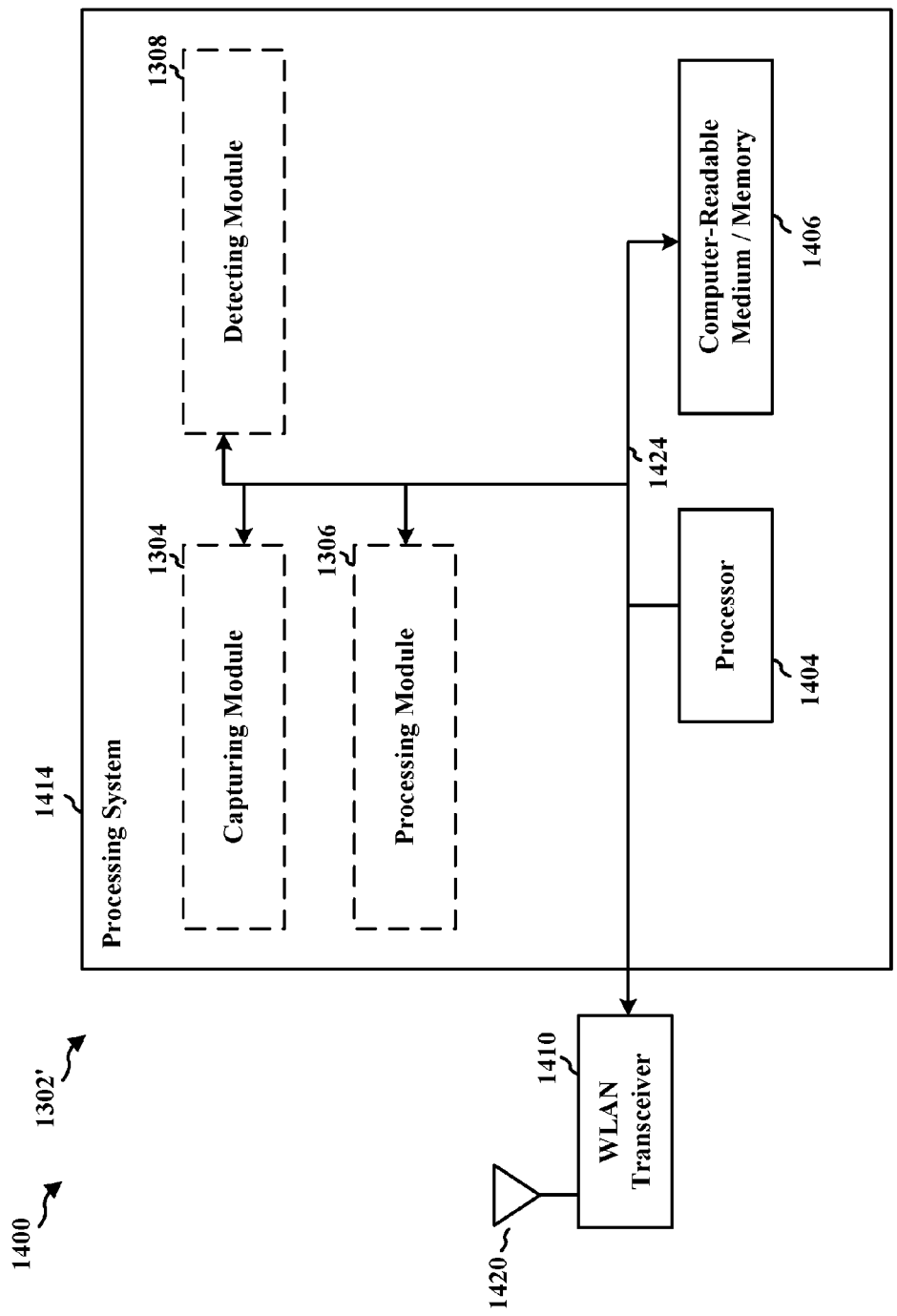
FIG. 14 is a diagram illustrating an example of a hardware implementation for an apparatus employing a processing system that implements the method of claim 12.

FIG. 14 is a diagram 1400 illustrating an example of a hardware implementation for an apparatus 1402' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1304, 1306, 1308, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a WLAN transceiver 1410. The WLAN transceiver 1410 is coupled to one or more antennas 1420. The WLAN transceiver 1410 provides a means for communicating with various other apparatus over a transmission medium. The transceiver 1410 receives a signal, e.g., a WWAN signal, from the one or more antennas 1420, extracts information from the received signal, and provides the extracted information to the processing system 1414. In addition, the WLAN transceiver 1410 receives information from the processing system 1414, and based on the received information, generates a signal to be applied to the one or more antennas 1420.

The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system further includes at least one of the modules 1304, 1306, and 1308. The modules may be software modules running in the processor 1404, resident/stored in the computer readable medium/memory 1406, one or more hardware modules coupled to the processor 1404, or some combination thereof. The processing system 1414 may be a component of the UE 650 and may include the memory 660 and/or at least one of the TX processor 668, the RX processor 656, and the controller/processor 659.

In one configuration, the apparatus 1302/1302' for wireless communication includes means for capturing data transmitted by the WWAN for each of a plurality of the communication frames, wherein the data is captured for a capture length corresponding to a duration less than a periodicity of transmission of the signal of interest, and each capture occurs at a different point within its respective communication frame relative to other communication frames, and the capturing is done with a WLAN receive chain. The apparatus 1302/1302' also includes means for processing the plurality of data captures to form an equivalent continuous data corresponding to a duration greater than the periodicity of transmission, and means for detecting the signal of interest in the continuous data.

The aforementioned means may be one or more of the aforementioned modules of the apparatus 1302 and/or the processing system 1314 of the apparatus 1302' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

The techniques described above apply to situations where the availability of the WLAN radio does not allow for a capture duration sufficient to capture a signal of interest in a single shot. For example, the situations above do not allow for a WLAN modem to capture 5.1 ms of data at once. Accordingly, multiple captures occur over time and are accumulated to obtain the 5.1 ms of data. In some situations, the WLAN modem may be available for longer periods of time to allow for signal capture in a single shot. As noted above, use of the LTE inter-frequency cell search and measurement assistance interrupts WLAN operation. Accordingly, even though the WLAN radio may be available for a longer period of time, care must be taken so as not to detrimentally impact WLAN performance.

Disclosed herein are techniques for co-existence mechanisms for LTE measurements by WLAN receive chain for WLAN only traffic and WLAN+BT traffic. Without such coexistence, LTE measurements by a WLAN radio may detrimentally impact WLAN operation, thereby leading to poor mobility performance, and diminished WLAN or WLAN+Bluetooth quality of service. It is noted that Bluetooth only traffic may not be a problem when WLAN and Bluetooth have independent frequency synthesizers The techniques for coexistence of LTE measurements using WLAN receive chain with WLAN and Bluetooth traffic disclosed herein meet LTE measurement periodicity, accuracy and other standards requirements; result in no or minimal degradation to WLAN or WLAN+Bluetooth quality of service, and allow for realization of the full benefits of LTE measurements by a WLAN receive chain, including avoidance of throughput loss due to measurement gaps, and expedited inter-frequency cell detection and offload. The techniques also avoid the need for dynamic change of UE capability with respect to the need for measurement gaps. In other words, implementation of the techniques provide for WLAN modem availability for LTE measurements, regardless of UE capability.

In general terms, a process for coexistence of LTE measurement using a WLAN radio for capturing a signal of interest periodically transmitted by a WWAN, includes periodically obtaining access to a WLAN receive chain for a period of time corresponding to a measurement gap. Access may be obtained in competition with actual WLAN traffic. Once access to the WLAN receive chain is obtained, the signal of interest is captured during the measurement gap over using the WLAN receive chain. The signal may be captured in a single shot. In other words, the duration of capture during the measurement gap may be sufficiently long so as to capture the single of interest. The process may further include periodically repeating the obtaining and the capturing.

In one technique, LTE data is captured by a WLAN modem during a capture length which is based on a measurement gap duration of a communication frame. The capturing is repeated for one or more additional communication frames based on a measurement gap repetition period. The measurement gap repetition period defines the spacing between consecutive measurement gaps. Measurements made using the WLAN modem may be scheduled so as to adjust one or more of the measurement gap duration or the measurement gap repetition period during one or more of the additional captures using several options.

In a first option, LTE measurements may be made based on the LTE measurement gap pattern id#0. In this pattern, measurements are made during a 6 ms measurement gap duration, every 40 ms (the measurement gap repetition period). In this case channel unavailability for WLAN+ Bluetooth would be about 15%.

In a second option, a more aggressive gap pattern may be used, provided there is no interference with Wi-Fi and Bluetooth. For example, measurements by the WLAN modem may be made for 6 ms plus an additional time, every 40 ms, or for 6 ms every 20 ms. The additional time may be between 0.1 and 0.5 ms. In this case, the channel unavailability for WLAN+Bluetooth is greater than 15%.

In a third option, the measurement gap length may be fixed at 6 ms and measurement gap repetition period is adaptive. For example, the repetition period may reduce every measurement gap such that a first 6 ms measurement gap occurs over the first 40 ms, a second 6 ms measurement gap occurs over the next 30 ms, a third 6 ms measurement gap occurs over the next 50 ms, and a fourth 6 ms measurement gap occurs over the next 40 ms. The following requirements must be met. A minimum available time for inter-frequency measurements during 480 ms period is 60 ms. Other requirements for cell detection, measurement accuracy, etc. also apply.

In other processes, access to a WLAN receive chain for purposes related to LTE measurements may be obtained using WLAN protocol or operating features. These protocols or features may lead an access point to grant WLAN receive chain access for LTE measurements over competing WLAN traffic.

In a first process of obtaining access to a WLAN receive chain for a period of time corresponding to a measurement gap, a requirement to make LTE measurements with the WLAN radio is treated as a virtual WLAN flow/queue. It is a virtual queue because the WLAN modem does not have packets to transmit while it is being used for LTE cell search and measurement. Flow characteristics are assigned to the virtual flow so it will compete with actual WLAN flows. Based on the relative priorities of the flows, either the virtual flow will obtain access to the WLAN receive chain for LTE measurements, or an actual flow will obtain access to the WLAN receive chain for its purposes, e.g., voice, video.

This mechanism may be used even when there are real time traffic flows over WLAN in the station, e.g. UE. For example, the particular station may be using voice over Wi-Fi or video streaming, with the virtual flow assigned for the LTE measurements, and assignment of appropriate parameters, it is ensured that the virtual flow is not blocking other stations from using the WLAN receive chain.

LTE measurements obtained by a WLAN receive chain may be treated as a virtual flow/queue with its own Arbitration Inter Frame Space (AIFS) and contention window (CW) maximum and CW minimum, i.e., CWmin, CWmax, for its access category (AC). By way of background, different types of WLAN traffic, e.g., voice, radio, etc., have different access categories. In this regard, the traffic corresponds to traffic to be transmitted by the WLAN. The access category determines the priority of access and length of access based on the assigned AIFS, contention window and TXOP. Example access categories include:

AC (Voice): 3 [CWmin: 7, CWmax: 15, AIFSN: 2]
AC (Video): 2 [CWmin: 15, CWmax: 31, AIFSN: 2]
AC (Background): 1 [CWmin: 31, CWmax: 1023, AIFSN: 3]
AC (Best Effort): 0 [CWmin: 31, CWmax: 1023, AIFSN: 7]

A transmit opportunity (TXOP) is a bounded time interval during which a station can send as many frames as possible (as long as the duration of the transmissions does not extend beyond the maximum duration of the TXOP). CWmin, CWmax indicate how long the WLAN modem should backoff when it senses that the WLAN receive chain associated with the AC is busy. Lower priority traffic will wait for a longer time than higher priority traffic. TXOP is approximately 1.5 ms for Voice and approximately 3 ms for Video. In one implementation, the TXOP for the virtual flow is set to 6 ms in order to obtain a duration sufficient to capture 5.1 ms for LTE measurements. Intra-station other queues will treat this as if LTE measurement "virtual flow" flow is using TXOP of 6 ms though no frames are transmitted over the air.

In an example implementation, a station has one queue that wants to send data. At the same time a LTE measurement "virtual flow" wants to use the WLAN receive chain to perform LTE measurements. Once a WLAN receive chain is sensed to be idle, both queues wait for their respective AIFS and calculated backoff periods. One may have smaller AIFS (higher priority) but calculated backoff may be higher. The queue for which AIFS and backoff period counts down to zero first wins the contention. Lower priority queue doubles the contention window and calculates a new backoff period as if a "physical collision" happened. If both queues count down to zero at the same time, a virtual collision occurs and the higher priority queue gets to transmit, while the lower priority queue follows the same procedure as if a "physical" collision had happened.

In a second process of obtaining access to a WLAN receive chain for a period of time corresponding to a measurement gap, a WLAN modem captures WWAN signals, e.g., LTE signals, while the station is in a power save mode. In this case, a station seeking to perform LTE measurements sets its WLAN radio to a power save mode after a period of WLAN inactivity. While the station is in power save mode, the access point thinks that the station powered off its transceiver to save power. However, in reality the WLAN modem is performing LTE measurements. After a period of inactivity, the station wakes up to see if its access point has any frames buffered for it. The periodicity of wake up by the WLAN radio is agreed upon between the access point and the WLAN radio. If the station has uplink traffic it will come out of the power save mode. The station may also come out of the power save mode if there is any downlink data buffered for it at the access point. In this case, the access point wakes up the station.

In a third process of obtaining access to a WLAN receive chain for a period of time corresponding to a measurement gap, enhancements to the power save mode are implemented. In one such enhancement, Unscheduled Automatic Power Save Delivery (U-APSD) is used. U-APSD is an asynchronous approach to power conservation defined in 802.11. This approach allows the client to request queued traffic at any time rather than waiting for the next beacon frame. In another enhancement, WMM Power Save (WMM-PS) is used. This mode is from the Wireless Multimedia (WMM) specification, based on U-APSD. It is often implemented in Wi-Fi handsets. In another enhancement, Power Save Multi-Poll (PSMP) is used. This is specified in 802.11n. The enhancement may use either of the scheduled and unscheduled versions. Using enhanced power save modes, allows for possible co-existence between LTE measurements and real-time traffic.

In a fourth process of obtaining access to a WLAN receive chain for a period of time corresponding to a measurement gap, existing 802.11k framework is leveraged to obtain access to WLAN receive chain for purposes of performing LTE measurements. This framework allows a station to autonomously decide to go from a Wi-Fi channel to a non-operating Wi-Fi channel for making LTE measurements for a specified duration determined by the station itself. For example, if a station is communicating with an access point on Wi-Fi channel 1, the station can to go to Wi-Fi channel 2 to make LTE measurements. Alternatively, the station may be asked by the access point or some other station to go to Wi-Fi channel 2. Once at the second Wi-Fi channel the station tunes away to the LTE frequency to make LTE measurements. In this proposal, the measuring station interrupts its data communication with the access point on the operating channel.

The LTE measurement duration on the non-operating channel may be based on the beacon interval. A typical bean interval is approximately 100 ms, which exceeds the approximately 72 ms needed to perform LTE measurements. The station determines the interval time between successive non-operating channel measurements. The interval time may be a fixed length, e.g., every 480 ms, or it may be determined by the station using application-specific knowledge. The measurement duration on non operating channel is defined by dot11RRMNonOperating-ChannelMaxMeasurementDuration.

In this proposal, the duration is sufficient to capture multiple 5.1 ms worth of samples, while the other stations are not blocked from using the WLAN receive chain. However, because of the duration of the tune away, this proposal may not be suitable for real-time traffic.

In a fifth process of obtaining access to a WLAN receive chain for a period of time corresponding to a measurement gap, the network allocation vector (NAV) is set to provide access to the WLAN receive chain for LTE measurements. The duration field in 802.11 is 16 bits. Therefore the largest value it could reserve the media for is 65,535 microseconds. However the standard explicitly states to ignore any values greater than 32,767. Accordingly, no certified station would grab the WLAN receive chain for this long. However, some stations may indicate a duration comparable to 6 ms.

Access to a WLAN receive chain is granted based on the NAV setting. When the WLAN receive chain is in use and the virtual carrier sensing mechanism has a NAV>=6 ms, and if LTE measurements are scheduled, then the LTE measurements will be scheduled. If the NAV<6 ms, 6 ms LTE measurements may be scheduled if the priority of LTE measurements "virtual" queue is highest amongst all queues. This process sets NAV to 6 ms so the virtual carrier sensing mechanism will not detect the WLAN receive chain as idle until LTE measurements are completed. In another configuration, a period of time, e.g., x ms, are schedule for LTE measurements where x<=current NAV value<6 ms.

In another process of obtaining access to a WLAN receive chain for a period of time corresponding to a measurement gap, in Soft-AP mode, a station functions both a client and an access point. In this case, the station may use the WWAN as backhaul for providing internet connection to other devices. This may be leveraged for LTE measurements where the station mode is not available during LTE measurements. Client switches between station and LTE measurement mode similar to the soft-AP mode where client switches between station and access point modes.

Combinations of the foregoing processes of obtaining access to a WLAN receive chain for a period of time corresponding to a measurement gap are possible. For example, with respect to antenna configuration, in the case of a 1×1 antenna configuration, LTE measurements must co-exist with WLAN as a single receive chain is shared. Here, it is recommended to use the first process (virtual queue) or third process (using WMM-PS) or fifth process (LTE measurements are done when NAV>6 ms due to WLAN receive chain usage by other clients) or any combination of these.

In the case of a 2×2 antenna configuration, if WLAN is using only one antenna, then LTE measurements can use the other antenna. There is no impact to WLAN. If WLAN is using two antennas, then one antenna is unavailable for ~15% of the time. During handshaking between WLAN and WWAN modems, if WLAN indicates capability for LTE measurements, LTE measurements will have a guaranteed quality of service. Otherwise, if LTE measurement requirements cannot be met, WLAN informs WWAN modem about this and the UE sends updated EUTRA capability to eNB regarding need for gaps for inter-frequency measurements. Handshaking done when new RRC connection is being established In some cases, WLAN and Bluetooth have separate receive chains and independent frequency synthesizers, although a local oscillator is shared. For example, if the WLAN Tx/Rx is on the 5G band and the Bluetooth Tx/Rx is on the 2.4G band, both can operate independently, even for 1×1 antenna configuration. As LTE measurements are obtained using the WLAN receive chain, and LTE measurements are on non ISM band, LTE measurements can occur simultaneously with Bluetooth operation, without affecting Bluetooth, due to frequency separation and independent synthesizers.

Coexistence between WLAN and Bluetooth may be more challenging as residual channel availability after WLAN and Bluetooth usage may not be sufficient for measurements. Coexistence will need updated arbitration procedures. For example, for non-measurement mode, existing arbitration procedures for WLAN and Bluetooth apply; for measurement mode, no WLAN Tx/Rx; Bluetooth Tx/Rx can happen independently. Maximal overlap between Bluetooth and LTE measurements is desired as they can happen without impacting each other while WLAN will be impacted by both LTE measurements and Bluetooth, for 1×1 antenna configuration.

Figure 15:
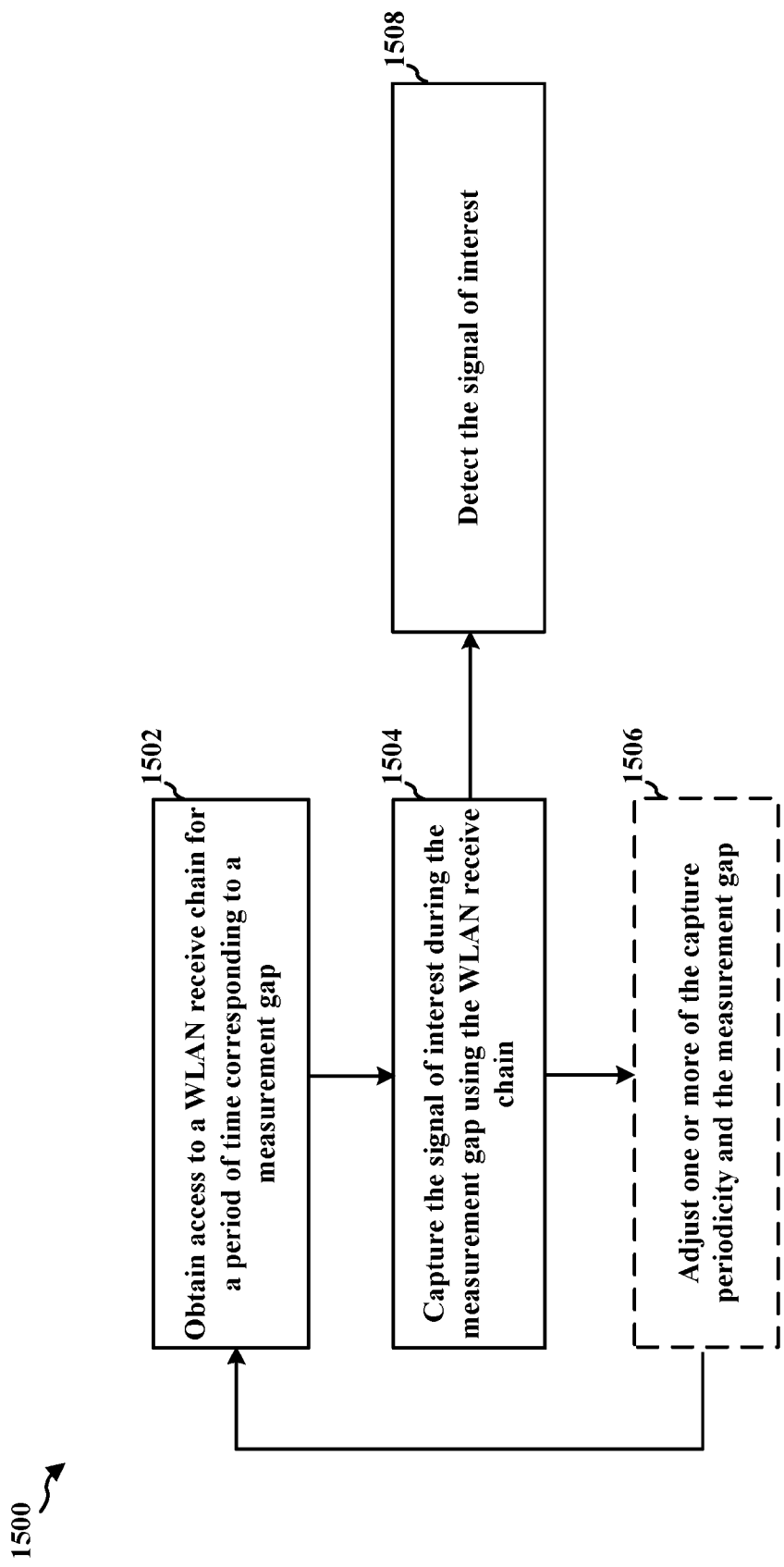
FIG. 15 is a flow chart of a method of capturing a signal of interest periodically transmitted by a WWAN.

FIG. 15 is a flow chart 1500 of a method of capturing a signal of interest periodically transmitted by a WWAN. The method may be performed by a UE. At step 1502, the UE obtains access to a WLAN receive chain for a period of time corresponding to a measurement gap.

At step 1504, the UE captures the signal of interest during the measurement gap using the WLAN receive chain. At step 1506, the UE optionally adjusts one or more of the capture periodicity and the measurement gap. The method then returns to step 1502, where the obtaining—and subsequently the capturing are repeated. At step 1508, the UE detects the signal of interest in the data captured during the one or more measurement gaps.

Access to a WLAN receive chain may be obtained in any one of several ways described above. For example, access may be obtained by 1) requesting WLAN receive chain access for LTE measurements through a virtual flow, 2) entering into a power save mode, 3) tuning to a non-operating WLAN channel, 4) setting network allocation vector (NAV) at or above a threshold value, or 5) entering a measurement mode during which the WLAN receive chain is prevented from performing WLAN operations.

Figure 16:
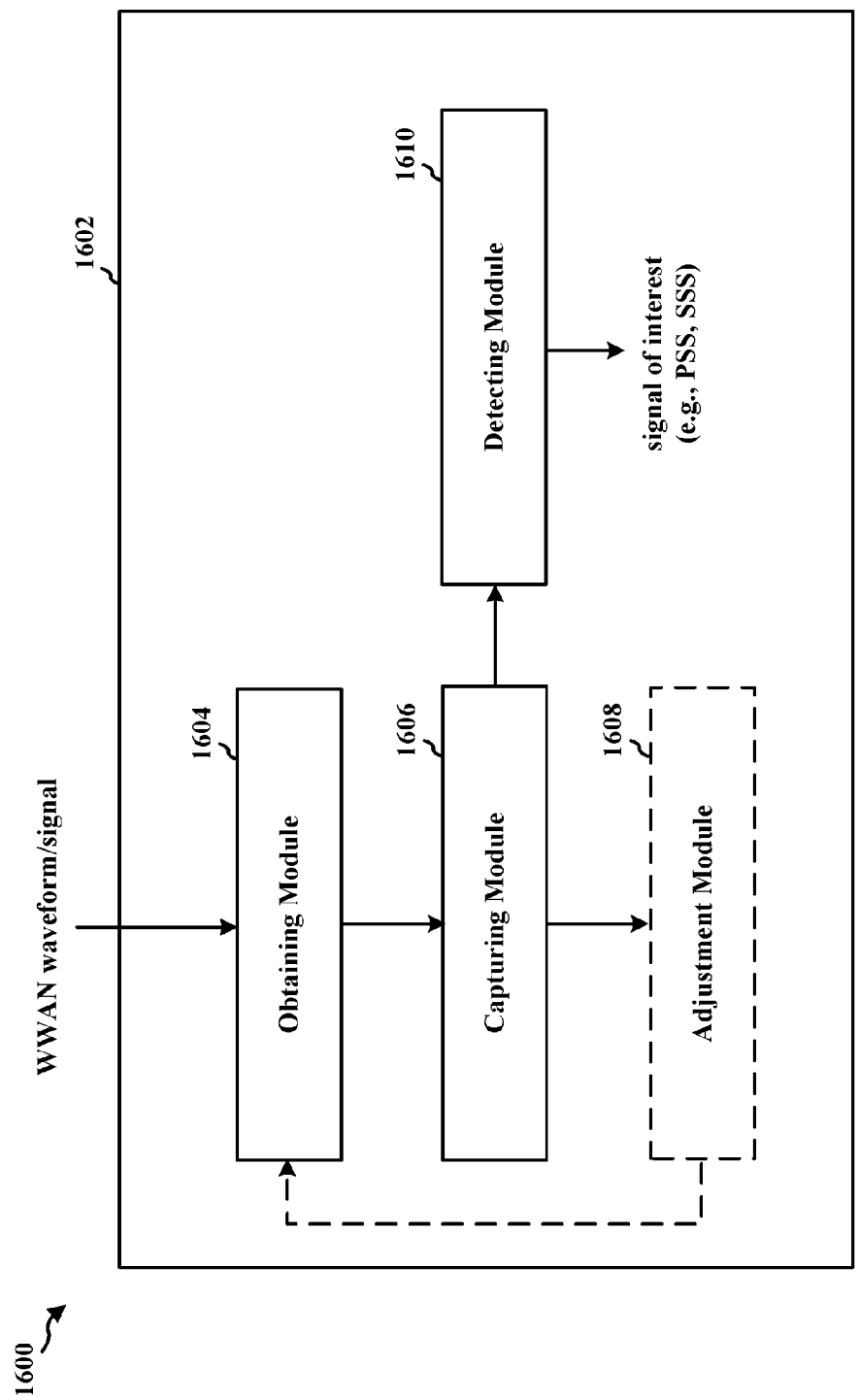
FIG. 16 is a conceptual data flow diagram illustrating the data flow between different modules/means/components in an exemplary apparatus that implements the method of FIG. 16.

FIG. 16 is a conceptual data flow diagram 1600 illustrating the data flow between different modules/means/components in an exemplary apparatus 1602. The apparatus 1602 may be a UE. The apparatus 1602 includes an access module 1604, a capture module 1606, an optional adjustment module 1608, and a detecting module 1610.

The access module 1604 obtains access to a WLAN receive chain for a period of time corresponding to a measurement gap. The capture module 1606 captures the signal of interest during the measurement gap using the WLAN receive chain. The adjustment module 1608 adjusts one or more of the capture periodicity and the measurement gap prior to the access module 1604 obtaining access to a WLAN receive chain again, and the capture module capturing the signal of interest again. The detecting module 1610 detects the signal of interest in the data captured by the capturing module 1606 during the one or more measurement gaps.

The apparatus may include additional modules that perform each of the steps of the algorithm in the aforementioned flow chart of FIG. 15. As such, each step in the aforementioned flow charts of FIG. 15 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 17:
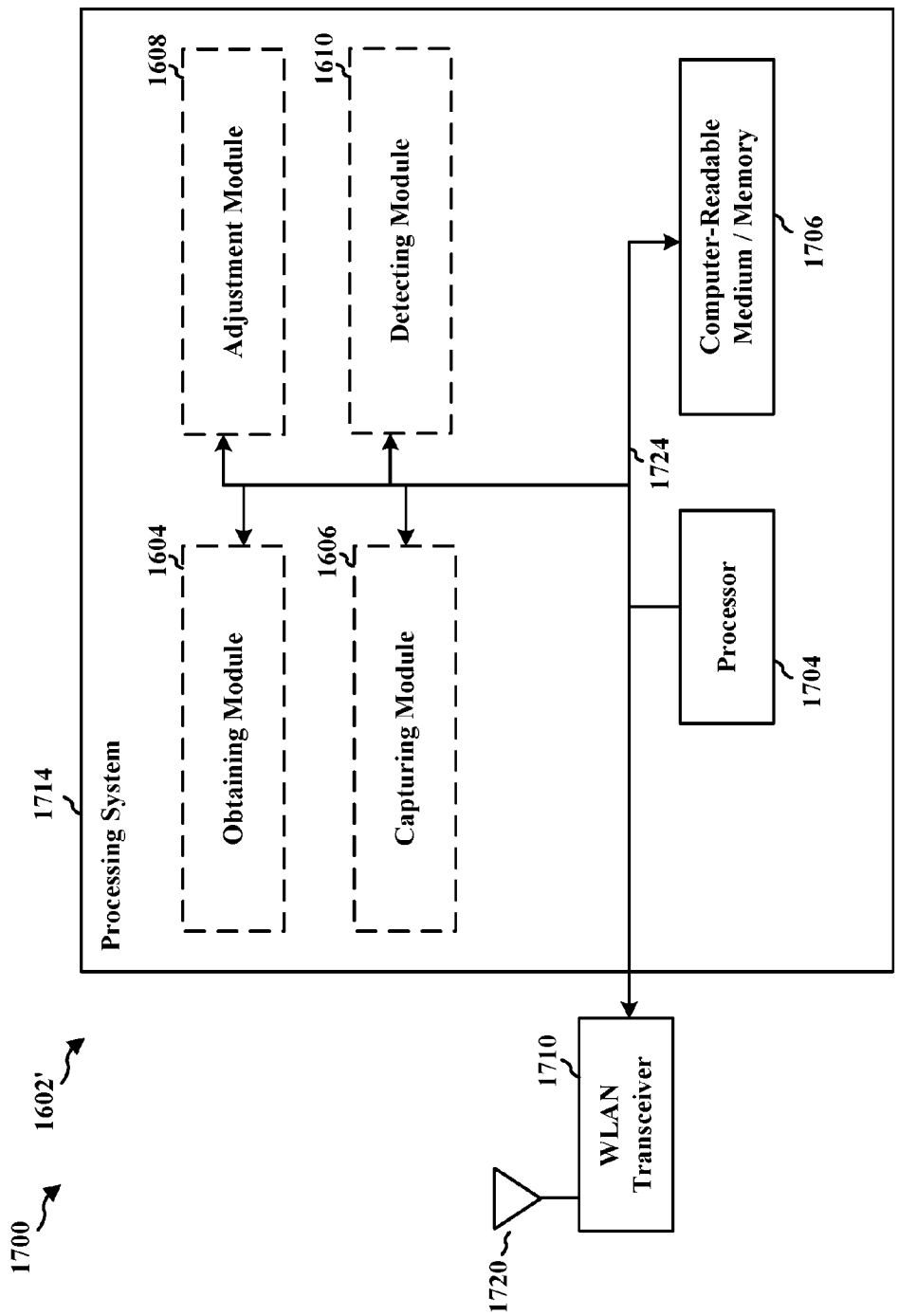
FIG. 17 is a diagram illustrating an example of a hardware implementation for an apparatus employing a processing system that implements the method of FIG. 15.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1704, the modules 1604, 1606, 1608, 1610 and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a WLAN transceiver 1710. The WLAN transceiver 1710 is coupled to one or more antennas 1720. The WLAN transceiver 1710 provides a means for communicating with various other apparatus over a transmission medium. The WLAN transceiver 1710 receives a signal from the one or more antennas 1720, extracts information from the received signal, and provides the extracted information to the processing system 1714. In addition, the WLAN transceiver 1710 receives information from the processing system 1714, and based on the received information, generates a signal to be applied to the one or more antennas 1720.

The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system further includes at least one of the modules 1604, 1606, 1608 and 1610. The modules may be software modules running in the processor 1704, resident/stored in the computer readable medium/memory 1706, one or more hardware modules coupled to the processor 1604, or some combination thereof. The processing system 1714 may be a component of the UE 650 and may include the memory 660 and/or at least one of the TX processor 668, the RX processor 656, and the controller/processor 659.

In one configuration, the apparatus 1602/1602' for wireless communication includes means for obtaining access to a WLAN receive chain for a period of time corresponding to a measurement gap, means for capturing the signal of interest during the measurement gap using the WLAN receive chain, means for periodically repeating the obtaining and the capturing, and means for detecting the signal of interest in the data captured during one or more measurement gaps. The apparatus 1602/1602' may also include means for adjusting one or more of the capture periodicity and the measurement gap during the repeating.

The aforementioned means may be one or more of the aforementioned modules of the apparatus 1602 and/or the processing system 1714 of the apparatus 1602' configured to perform the functions recited by the aforementioned means. As described supra, the processing system 1714 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method of measuring transmissions periodically transmitted by a first radio access technology (RAT) at a user equipment (UE) comprising both a first receive chain for the first RAT and a second receive chain for a second RAT, the method comprising:
    obtaining access to at least a part of the second receive chain for the second RAT of the UE for a period of time to measure a signal quality for transmissions from the first RAT;
    refraining from measuring transmissions transmitted by the first RAT using the first receive chain for the first RAT;
    measuring the transmissions transmitted by the first RAT, during the period of time using the second receive chain for the second RAT; and
    periodically repeating the obtaining and the measuring.

2. The method of claim 1, wherein the first RAT comprises Long Term Evolution (LTE).

3. The method of claim 2, wherein the second RAT comprises a wireless local area network (WLAN).

4. The method of claim 1, further comprising adjusting one or more of a measurement periodicity and the period of time during the repeating.

5. The method of claim 1, wherein obtaining access to the second receive chain for the second RAT comprises:
    assigning one or more flow characteristics to a virtual flow for the second RAT to allow for contention processing between the virtual flow and at least one actual flow for the second RAT; and
    accessing the second receive chain for the second RAT when the virtual flow wins the contention.

6. The method of claim 1, wherein obtaining access to the second receive chain for the second RAT comprises setting a radio for the second RAT to a power save mode.

7. The method of claim 1, wherein obtaining access to the second receive chain for the second RAT comprises tuning the second receive chain for the second RAT to a non-operating channel.

8. The method of claim 1, wherein obtaining access to the second receive chain for the second RAT comprises setting a network allocation vector (NAV) associated with the second receive chain for the second RAT to a value at or above a threshold value.

9. The method of claim 1, wherein obtaining access to the second receive chain for the second RAT comprises entering a measurement mode during which the receive chain for the second RAT is prevented from performing operations for the second RAT.

10. An apparatus for measuring transmissions periodically transmitted by a first radio access technology (RAT), comprising:
    a first receive chain for a first RAT;
    a second receive chain for a second RAT;
    means for obtaining access to at least a part of the second receive chain for the second RAT of the UE for a period of time to measure a signal quality for transmission from the first RAT;
    means for refraining from measuring transmissions transmitted by the first using the first receive chain for the first RAT and instead measuring the transmissions transmitted by the first RAT, during the period of time using the second receive chain for the second RAT; and
    means for periodically repeating the obtaining and the measuring.

11. The apparatus of claim 10, wherein the first RAT comprises Long Term Evolution (LTE) and the second RAT comprises a wireless local area network (WLAN).

12. An apparatus for measuring transmissions periodically transmitted by a first radio access technology (RAT), comprising:
    a first receive chain for a first RAT;
    a second receive chain for a second RAT;
    a memory; and
    at least one processor coupled to the memory and configured to:
        obtain access to at least a part of the second receive chain for the second RAT of the UE for a period of time to measure a signal quality for transmission from the first RAT;
        refrain from measuring transmissions transmitted by the first RAT using the first receive chain for the first RAT;
        measure the transmissions transmitted by the first RAT, during the period of time using the second receive chain for the second RAT; and
        periodically repeat the obtaining and the measuring.

13. The apparatus of claim 12, wherein the first RAT comprises Long Term Evolution (LTE) and the second RAT comprises a wireless local area network (WLAN).

14. The apparatus of claim 12, wherein the at least one processor is further configured to adjust one or more of a measurement periodicity and the period of time during the repeating.

15. The apparatus of claim 12, wherein to obtain access to the second receive chain for the second RAT, the at least one processor is configured to:
    assign one or more flow characteristics to a virtual flow for the second RAT to allow for contention processing between the virtual flow and at least one actual flow for the second RAT; and
    access the second receive chain for the second RAT when the virtual flow wins the contention.

16. A non-transitory computer-readable medium storing computer executable code for measuring transmissions periodically transmitted by a first radio access technology (RAT) at a user equipment (UE) comprising both a first receive chain for the first RAT and a second receive chain for a second RAT, comprising code to:
    obtain access to at least a part of the second receive chain for the second RAT of the UE for a period of time to measure a signal quality for transmission from the first RAT;
    refrain from measuring transmissions transmitted by the first RAT using the first receive chain for the first RAT;
    measure the transmissions transmitted by the first RAT, during the period of time using the second receive chain for the second RAT; and
    periodically repeat the obtaining and the measuring.

17. The computer-readable medium of claim 16, wherein the first RAT comprises a Long Term Evolution (LTE) and the second RAT comprises a wireless local area network (WLAN).

18. A method by a user equipment (UE) of measuring transmissions periodically transmitted by a licensed radio access technology (RAT), wherein the UE comprises a first receive chain for a licensed RAT and a second receive chain for an unlicensed RAT, the method comprising:

obtaining access to at least a part of the second receive chain for the unlicensed RAT of the UE for a period of time to measure a signal quality for transmissions from the licensed RAT;
refraining from measuring transmissions transmitted by the licensed RAT using the first receive chain for the licensed RAT;
measuring the transmissions transmitted by the licensed RAT during the period of time using the second receive chain for the unlicensed RAT; and
periodically repeating the obtaining and the measuring.

19. The method of claim 18, wherein the licensed RAT comprises a wireless wide area network (WWAN) and the unlicensed RAT comprises a wireless local area network (WLAN).

20. The method of claim 19, wherein the licensed RAT comprises Long Term Evolution (LTE).

21. The method of claim 18, further comprising adjusting one or more of a measurement periodicity and the period of time during the repeating.

22. The method of claim 18, wherein obtaining access to the second receive chain for the unlicensed RAT comprises:
assigning one or more flow characteristics to a virtual flow for the unlicensed RAT to allow for contention processing between the virtual flow and at least one actual flow for the unlicensed RAT; and
accessing the second receive chain for the unlicensed RAT when the virtual flow wins the contention.

23. The method of claim 18, wherein obtaining access to the second receive chain for the unlicensed RAT comprises setting a radio for the unlicensed RAT to a power save mode.

24. The method of claim 18, wherein obtaining access to the second receive chain for the unlicensed RAT comprises tuning the receive chain for the unlicensed RAT to a non-operating channel.

25. The method of claim 18, wherein obtaining access to the second receive chain for the unlicensed RAT comprises setting a network allocation vector (NAV) associated with the second receive chain for the unlicensed RAT to a value at or above a threshold value.

26. The method of claim 18, wherein obtaining access to the second receive chain for the unlicensed RAT comprises entering a measurement mode during which the second receive chain for the unlicensed RAT is prevented from performing operations for the unlicensed RAT.

27. An apparatus for measuring transmissions periodically transmitted by a licensed radio access technology (RAT), comprising:
a first receive chain for a licensed RAT;
a second receive chain for an unlicensed RAT;
means for obtaining access to at least a part of the second receive chain for the unlicensed RAT of the UE for a period of time to measure a signal quality for the transmissions from the licensed RAT;
means for refraining from measuring transmissions transmitted by the licensed RAT using the first receive chain for the licensed RAT and for measuring the transmissions transmitted by the licensed RAT during the period of time using the second receive chain for the unlicensed RAT; and
means for periodically repeating the obtaining and the measuring.

28. The apparatus of claim 27, wherein the licensed RAT comprises a wireless wide area network (WWAN) and the unlicensed RAT comprises a wireless local area network (WLAN).

29. An apparatus for measuring transmissions periodically transmitted by a licensed radio access technology (RAT), comprising:
a first receive chain for a licensed RAT;
a second receive chain for an unlicensed RAT;
a memory; and
at least one processor coupled to the memory and configured to:
obtain access to at least a part of the second receive chain for the unlicensed RAT of the UE for a period of time to measure a signal quality for transmissions from the licensed RAT;
refrain from measuring transmissions transmitted by the licensed RAT using the first receive chain for the licensed RAT;
measure the transmissions transmitted by the licensed RAT, during the period of time using the second receive chain for the unlicensed RAT; and
periodically repeat the obtaining and the measuring.

30. The apparatus of claim 29, wherein the licensed RAT comprises a wireless wide area network (WWAN) and the unlicensed RAT comprises a wireless local area network (WLAN).

31. The apparatus of claim 29, wherein the at least one processor is further configured to adjust one or more of a measurement periodicity and the period of time during the repeating.

32. The apparatus of claim 29, wherein to obtain access to the receive chain for the unlicensed RAT, the at least one processor is configured to:
assign one or more flow characteristics to a virtual flow for the unlicensed RAT to allow for contention processing between the virtual flow and at least one actual flow for the unlicensed RAT; and
access the second receive chain for the unlicensed RAT when the virtual flow wins the contention.

33. A non-transitory computer-readable medium storing computer executable code for measuring transmissions periodically transmitted by a licensed radio access technology (RAT) by a user equipment (UE), wherein the UE comprises a first receive chain for a licensed RAT and a second receive chain for an unlicensed RAT, comprising code to:
obtain access to at least a part of the second receive chain for the unlicensed RAT of the UE for a period of time to measure a signal quality for transmissions from the licensed RAT;
refrain from measuring transmissions transmitted by the licensed RAT using the first receive chain for the licensed RAT;
measure the transmissions transmitted by the licensed RAT during the period of time using the second receive chain for the unlicensed RAT; and
periodically repeat the obtaining and the measuring.

34. The computer-readable medium of claim 33, wherein the licensed RAT comprises a wireless wide area network (WWAN) and the unlicensed RAT comprises a wireless local area network (WLAN).

* * * * *